US011375822B2

(12) United States Patent
Wesolowski et al.

(10) Patent No.: US 11,375,822 B2
(45) Date of Patent: Jul. 5, 2022

(54) FOLDING BED SYSTEM

(71) Applicant: Lippert Components, Inc., Elkhart, IN (US)

(72) Inventors: Joseph Wesolowski, Mishawaka, IN (US); Jeremiah R. Bradley, Nappanee, IN (US); Evan Whitney, Edwardsburg, MI (US); David G. Skinner, Elkhart, IN (US); Dominic Layne, South Bend, IN (US); Brian Carlson, South Bend, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 44 days.

(21) Appl. No.: 16/716,544

(22) Filed: Dec. 17, 2019

(65) Prior Publication Data
US 2020/0196768 A1    Jun. 25, 2020

Related U.S. Application Data

(60) Provisional application No. 62/782,635, filed on Dec. 20, 2018, provisional application No. 62/814,415, filed on Mar. 6, 2019.

(51) Int. Cl.
*A47C 17/20* (2006.01)
*B60N 2/34* (2006.01)
(Continued)

(52) U.S. Cl.
CPC ............ *A47C 17/20* (2013.01); *A47C 17/165* (2013.01); *B60N 2/34* (2013.01); *B60N 3/008* (2013.01)

(58) Field of Classification Search
CPC ... A47C 17/20; A47C 17/165; A47C 17/1655; A47C 17/17; A47C 17/175;
(Continued)

(56) References Cited

U.S. PATENT DOCUMENTS

| 5,231,711 A | 8/1993 | Hayakawa |
| 6,523,194 B2 | 2/2003 | Smith |

(Continued)

FOREIGN PATENT DOCUMENTS

| CN | 107348728 A | * 11/2017 |
| CN | 108078267 | 5/2018 |

(Continued)

*Primary Examiner* — David R Hare
*Assistant Examiner* — Adam C Ortiz
(74) *Attorney, Agent, or Firm* — Nixon & Vanderhye P.C.

(57) ABSTRACT

A folding bed system includes a bed frame having a head section, a center section, and a foot section. The center section is connected to first and second slide mechanisms, and the head section is connected to first and second guide mechanisms. The slide and guide mechanisms are connectable to opposed walls of a structure. In some embodiments, a hinge assembly for a folding structure includes a center post securable to the center section, and a connecting bracket movably coupled with the center post that is vertically displaceable on the center post between a down position and an up position. A forward bracket is secured at one end to the connecting bracket and is securable at an opposite end to the head section, and an aft bracket is secured at one end to the connecting bracket and is securable at an opposite end to the foot section.

6 Claims, 31 Drawing Sheets

(51) Int. Cl.
*A47C 17/165* (2006.01)
*B60N 3/00* (2006.01)

(58) Field of Classification Search
CPC . A47C 17/1753; A47C 17/1756; A47C 17/38;
A47C 17/52; A47C 19/12
See application file for complete search history.

(56) References Cited

U.S. PATENT DOCUMENTS

| | | | |
|---|---|---|---|
| 8,091,159 B2 * | 1/2012 | Harris | A47C 17/2073 |
| | | | 5/18.1 |
| 8,186,744 B1 * | 5/2012 | Hanser | B60P 3/39 |
| | | | 296/170 |
| 8,850,637 B1 * | 10/2014 | Burchett | A47C 17/40 |
| | | | 5/136 |
| 9,456,698 B2 | 10/2016 | Oh | |
| 2013/0145548 A1 * | 6/2013 | Grone | A47C 17/52 |
| | | | 5/136 |
| 2016/0206113 A1 * | 7/2016 | Rawls-Meehan | A47C 21/003 |
| 2016/0316920 A1 | 11/2016 | Leipziger | |
| 2018/0140104 A1 | 5/2018 | An | |
| 2018/0263374 A1 | 9/2018 | Porter | |

FOREIGN PATENT DOCUMENTS

| | | |
|---|---|---|
| CN | 108354377 | 8/2018 |
| CN | 108669895 | 10/2018 |
| EP | 1 033 094 | 1/2004 |
| WO | WO 2019/021026 | 1/2019 |

* cited by examiner

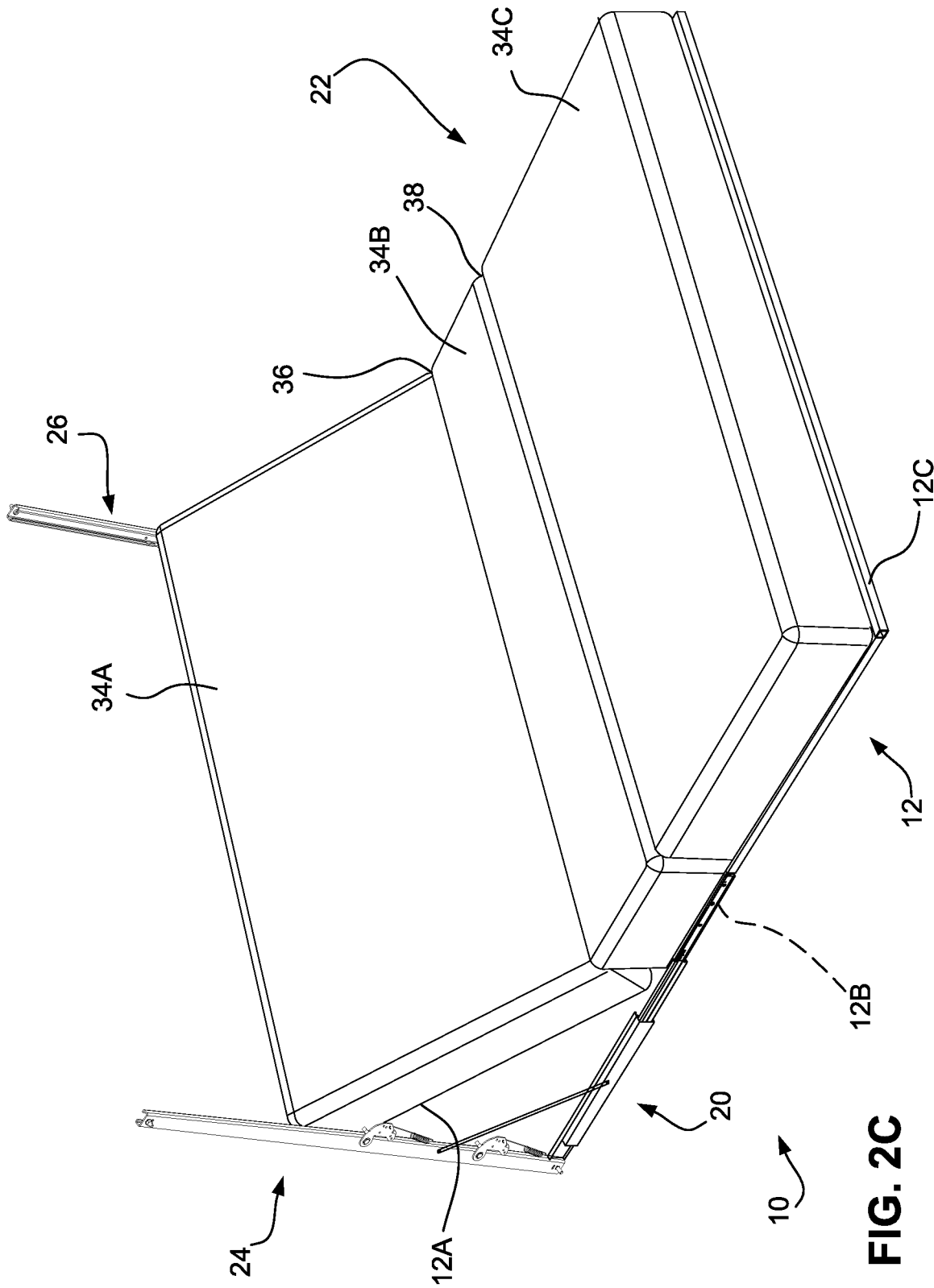

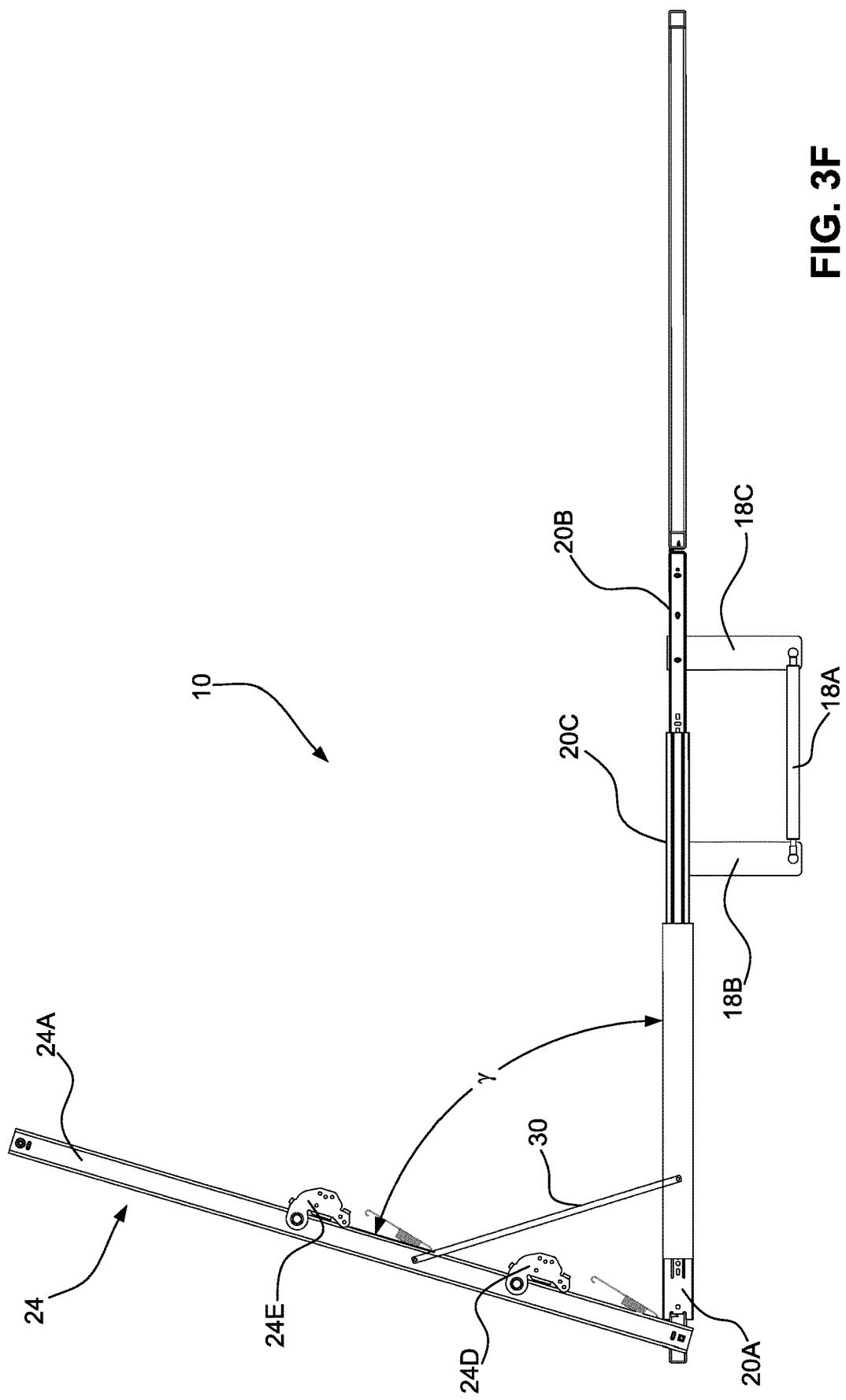

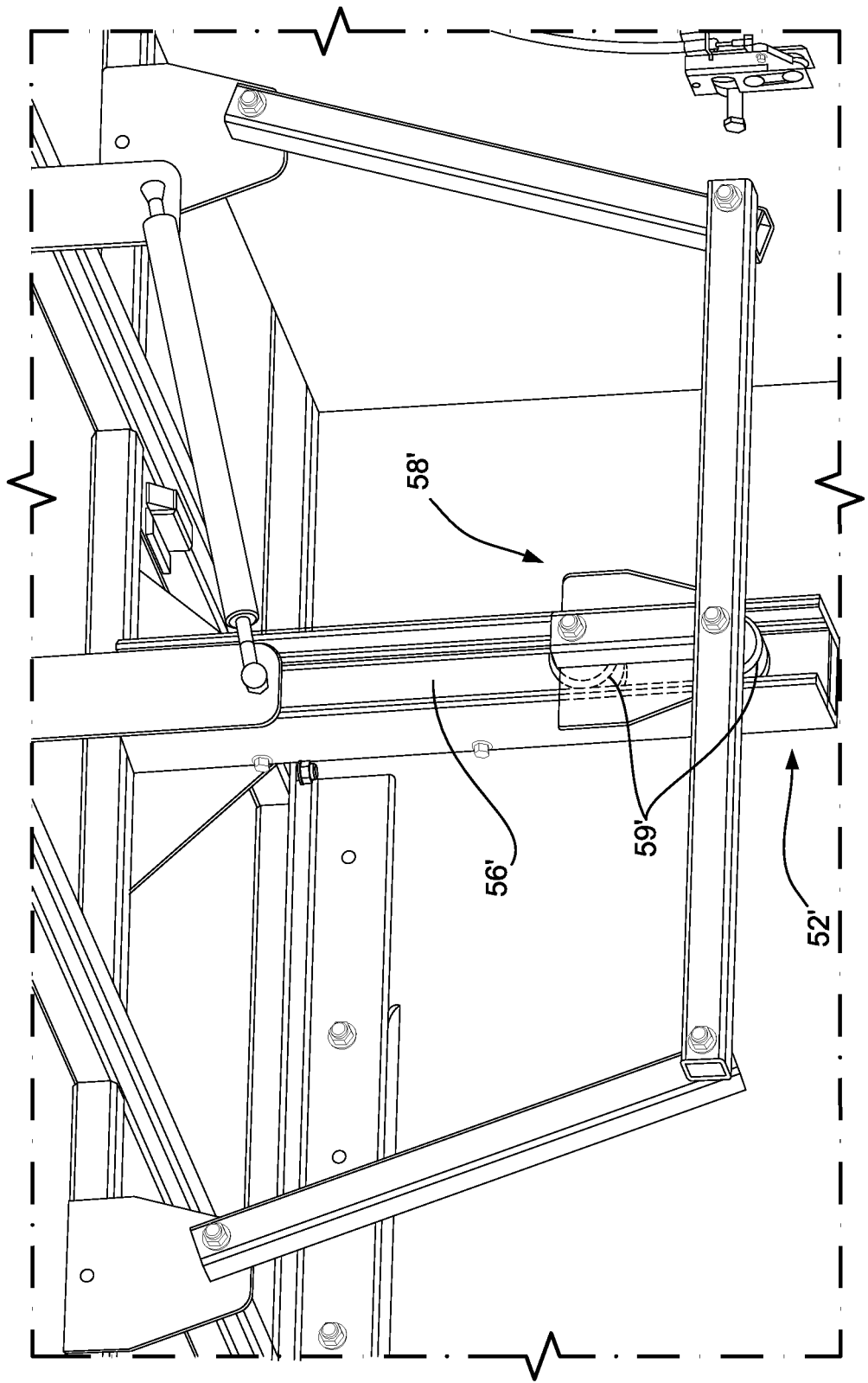

FOLDING BED SYSTEM

CROSS-REFERENCES TO RELATED APPLICATIONS

This application claims the benefit of U.S. Provisional Patent Application No. 62/782,635, filed Dec. 20, 2018, and U.S. Provisional Patent Application No. 62/814,415, filed Mar. 6, 2019, the entire content of each of which is herein incorporated by reference.

STATEMENT REGARDING FEDERALLY SPONSORED RESEARCH OR DEVELOPMENT (NOT APPLICABLE)

BACKGROUND & SUMMARY

Folding bed systems, for example, Murphy beds and convertible sofas, are known in the art. The present disclosure is directed to a folding bed system configured for integration into a structure, for example, a cabinet or a room of a recreational vehicle (RV) or trailer.

In an exemplary embodiment, a hinge assembly for a folding structure with a head section pivotably coupled to a center section, and a foot section pivotably coupled to the center section includes a center post securable to the center section, and a connecting bracket movably coupled with the center post that is vertically displaceable on the center post between a down position and an up position. A forward bracket is secured at one end to the connecting bracket and is securable at an opposite end to the head section, and an aft bracket is secured at one end to the connecting bracket and is securable at an opposite end to the foot section. A biasing mechanism secured between the center section and the head section may be configured to bias the head section toward a head end stowed position.

The center post may include a track member defining at least one vertical track, and the hinge assembly may further include a roller unit coupled with the connecting bracket and engaging the at least one vertical track. In this context, the vertical member may include two vertical tracks, and the roller unit may include two rollers coupled with the connecting bracket and respectively engaging the two vertical tracks.

The forward bracket may be pivotably secured to the connecting bracket and pivotably securable to the head section, and the aft bracket may be pivotably secured to the connecting bracket and pivotably securable to the foot section. The hinge assembly may also include a first frame connector securable to the head section and a second frame connector securable to the foot section, where the forward bracket may be connected between the first frame connector and the connecting bracket, and where the aft bracket may be connected between the second frame connector and the connecting bracket.

In another exemplary embodiment, a folding structure includes a center section including a head end and a foot end, a head section pivotably coupled to the head end of the center section and pivotable between a head end stowed position and a head end deployed position, and a foot section pivotably coupled to the foot end of the center section and pivotable between a foot end stowed position and a foot end deployed position. The folding structure also includes the hinge assembly of the described embodiments.

A biasing mechanism secured between the center section and the head section may be configured to bias the head section toward the head end stowed position. The head end stowed position and the foot end stowed position may correspond to the up position of the connecting bracket, and the head end deployed position and the foot end deployed position may correspond to the down position of the connecting bracket.

In yet another exemplary embodiment, a folding bed system configured for integration with a structure includes a bed frame having a head section, a center section connected to and pivotable relative to the head section, and a foot section connected to and pivotable relative to the center section. A slide mechanism includes a slide rail fixed to the center section and a guide rail coupled with and linearly displaceable relative to the slide rail. The guide rail is securable to the structure. A guide mechanism includes a guide track and a slider linearly displaceable relative to the guide track. The slider includes an engagement pin coupled with the head section of the bed frame, and the guide track is securable to the structure.

BRIEF DESCRIPTION OF THE DRAWINGS

These and other aspects and advantages will be described in detail with reference to the accompanying drawings, in which:

FIG. 2C is a perspective view of the folding bed system of FIG. 1A in the intermediate configuration;

FIG. 3F is a side elevation view of the folding bed system of FIG. 1A in the fully deployed configuration with the mattress removed;

FIG. 7A is a close-up view of an alternative center post of the hinge assembly;

DETAILED DESCRIPTION

The drawings show an illustrative folding bed system 10 according to the present disclosure, both in isolation and in combination with a supporting structure S and an associated article of furniture F. FIGS. 1A-1D show the folding bed system 10 in a stowed or folded configuration, FIGS. 2A-2D show the folding bed system in an intermediate configuration, and FIGS. 3A-3D show the folding bed system in a fully deployed or flat configuration.

The folding bed system 10 includes a folding bed frame 12 having a head section 12A, a center section 12B, and a foot section 12C. Each of the head section 12A, the center section 12B, and the foot section 12C has a head end, a foot end, a first side, and a second side. The foot end of the head section 12A is pivotably connected to the head end of the center section 12B by a first hinge 14. The foot end of the center section 12B is pivotably connected to the head end of the foot section 12C by a second hinge 16. In an embodiment, one or more legs (not shown) may be pivotably connected to the foot section 12C distant from the second hinge 16. Such leg(s) may be proximate the foot end of the foot section 12C.

Figure 1A:
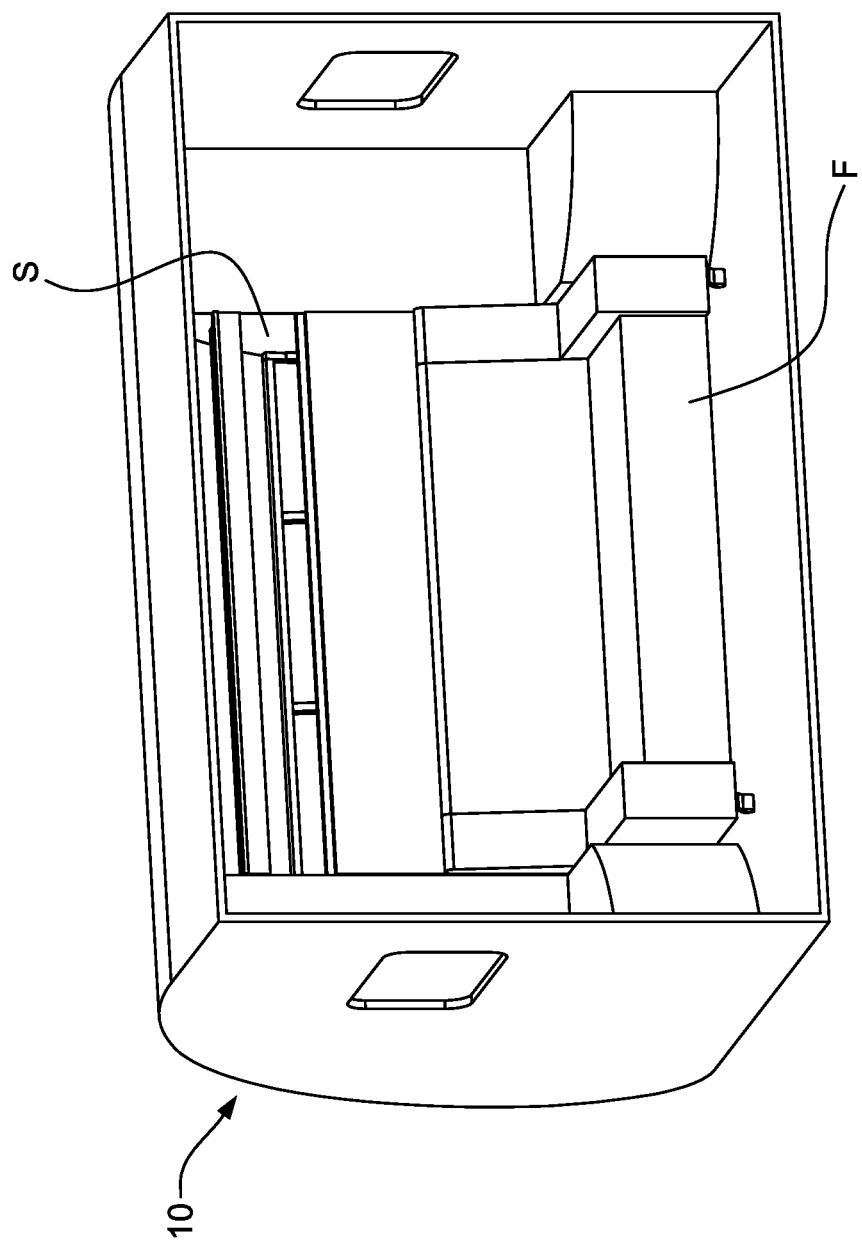
FIG. 1A is a perspective view of a folding bed system installed in a structure and combined with an article of furniture, with the folding bed system in a stowed configuration.
Figure 1B:
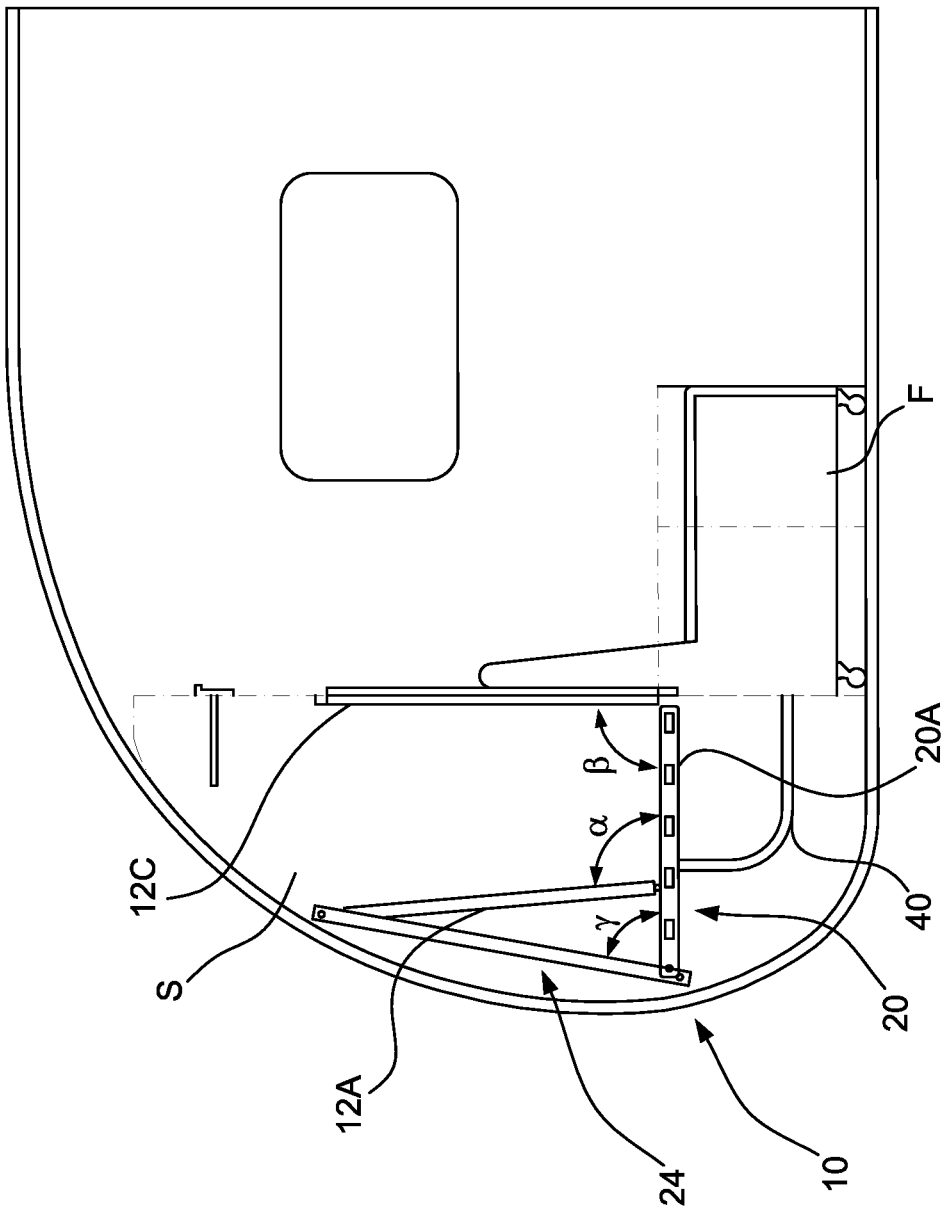
FIG. 1B is an end elevation view of the folding bed system, structure, and article of furniture of FIG. 1A, with the folding bed system in the stowed configuration.
Figure 1C:
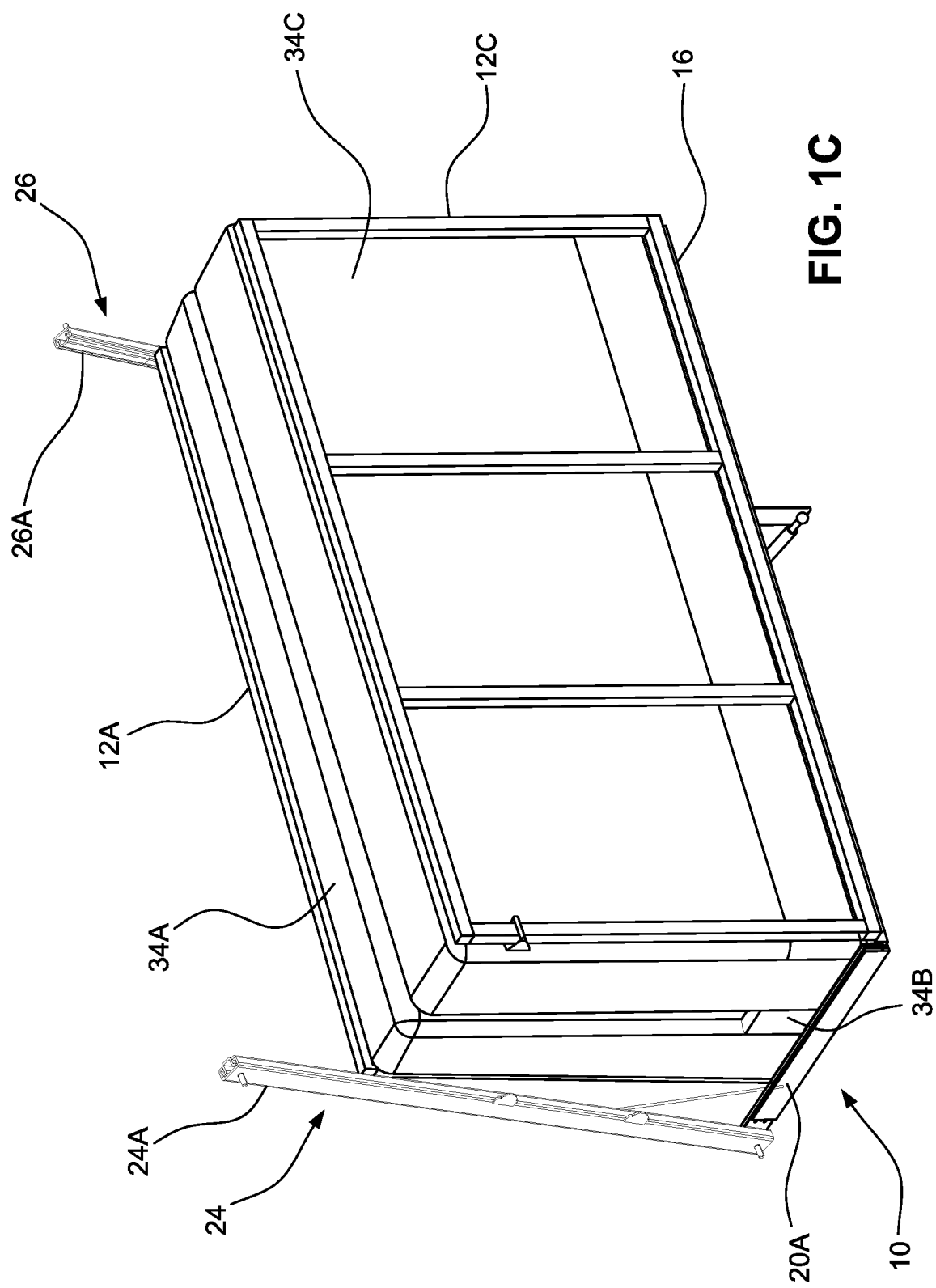
FIG. 1C is a perspective view of the folding bed system of FIG. 1A in the stowed configuration.
Figure 1D:
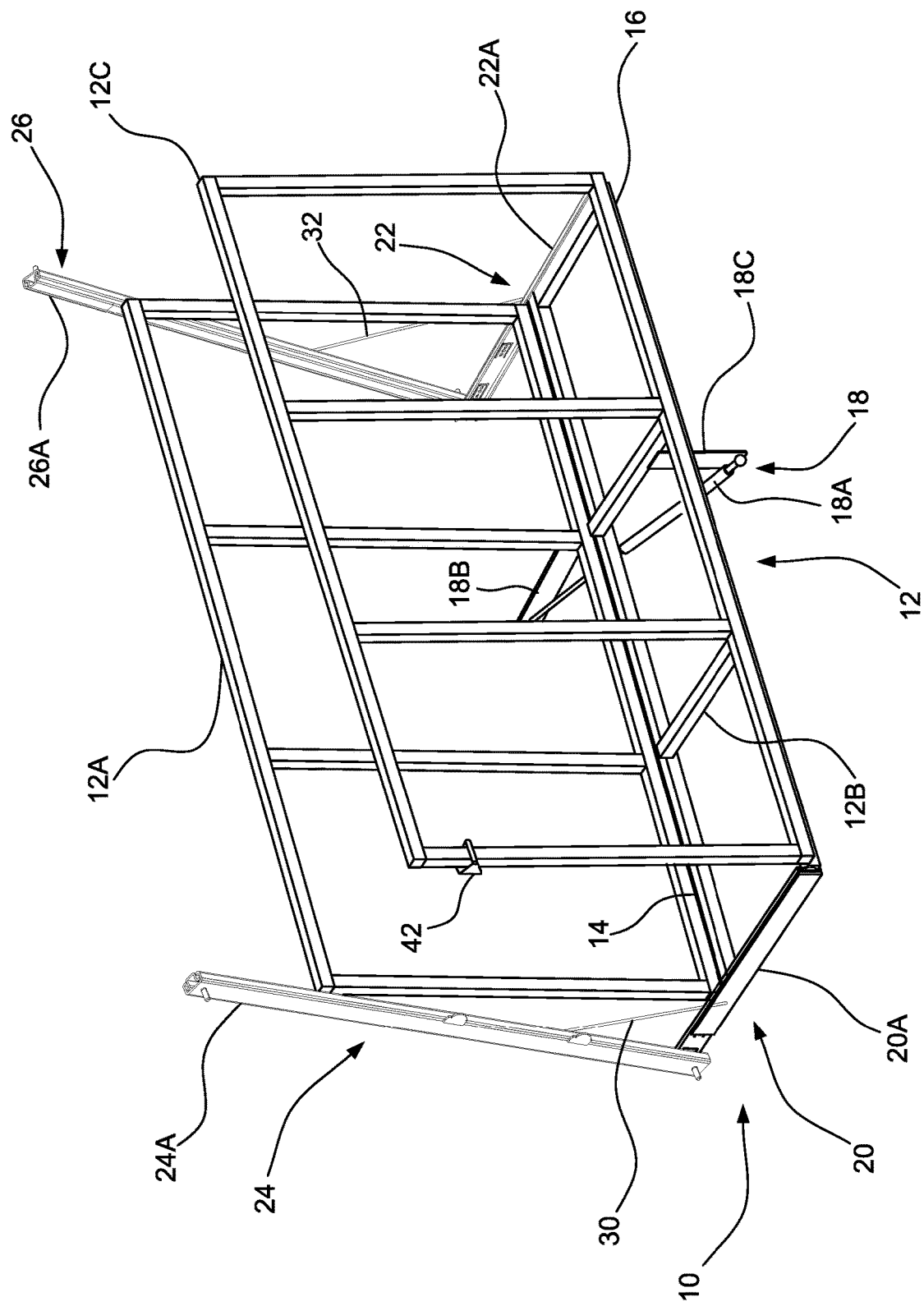
FIG. 1D is a perspective view of the folding bed system of FIG. 1A in the stowed configuration with the mattress removed.
Figure 2A:
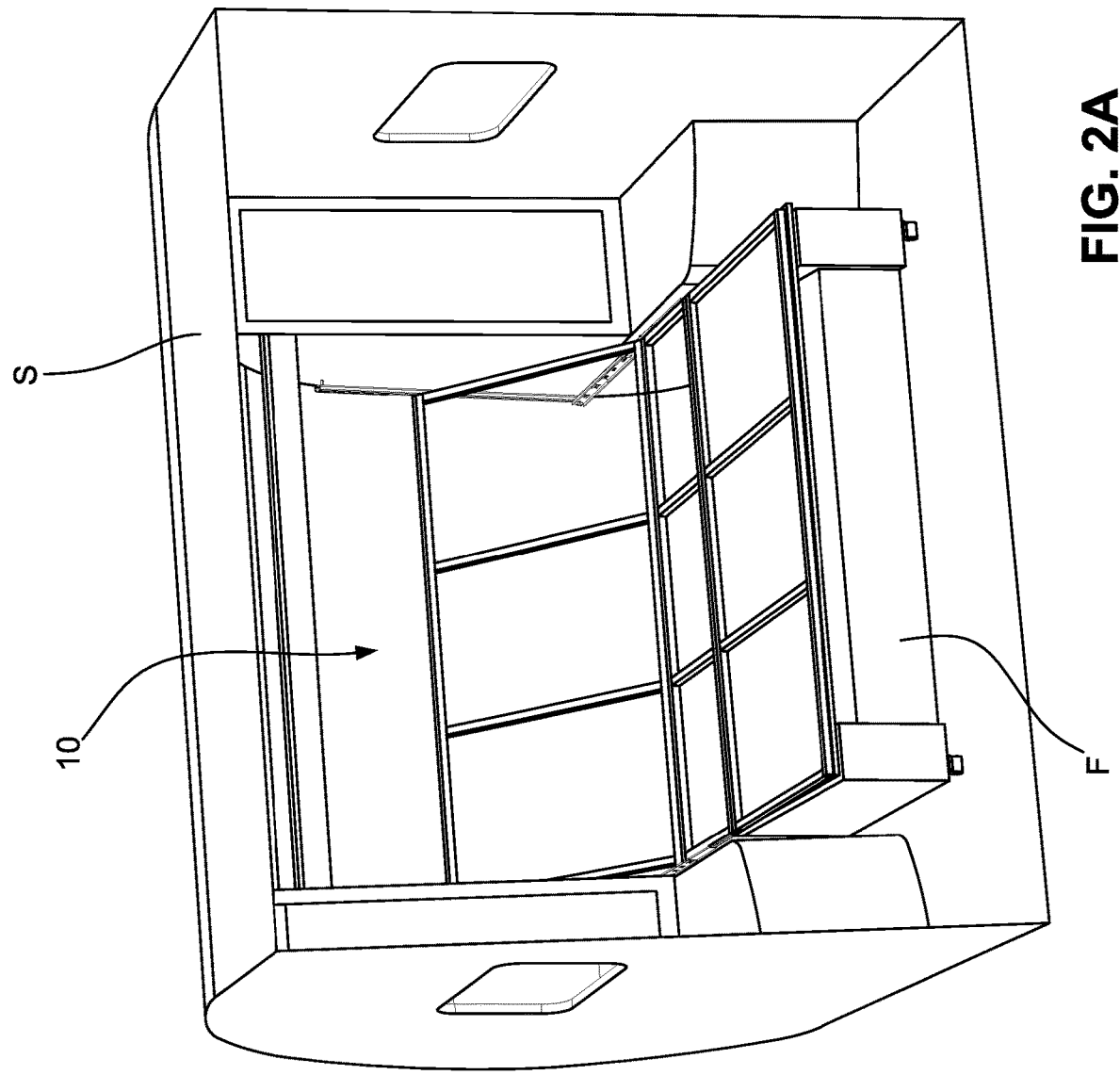
FIG. 2A is a perspective view of the folding bed system of FIG. 1A installed in the structure and combined with the article of furniture, with the folding bed system in an intermediate configuration.
Figure 2B:
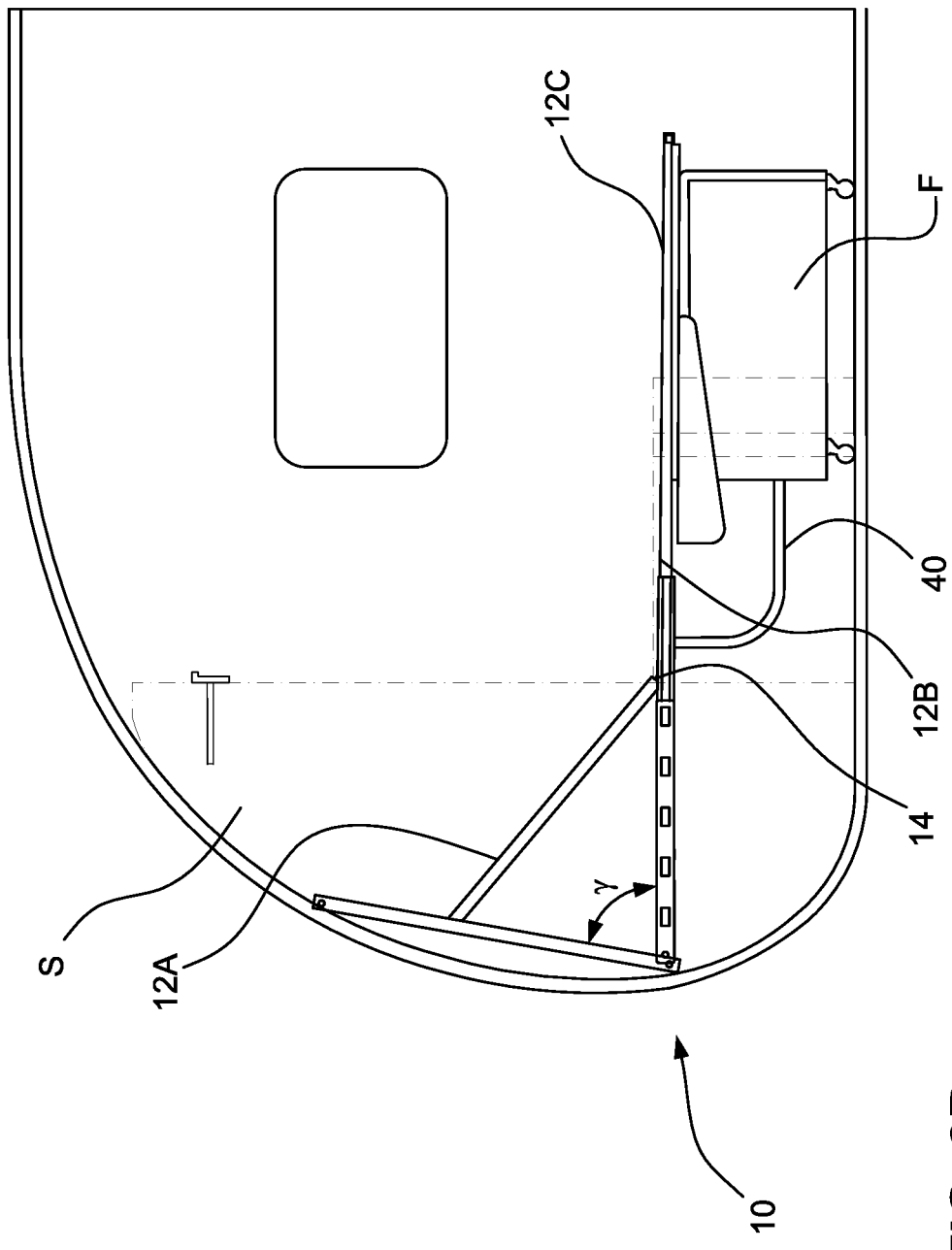
FIG. 2B is an end elevation view of the folding bed system, structure, and article of furniture of FIG. 1A, with the folding bed system in the intermediate configuration.
Figure 2D:
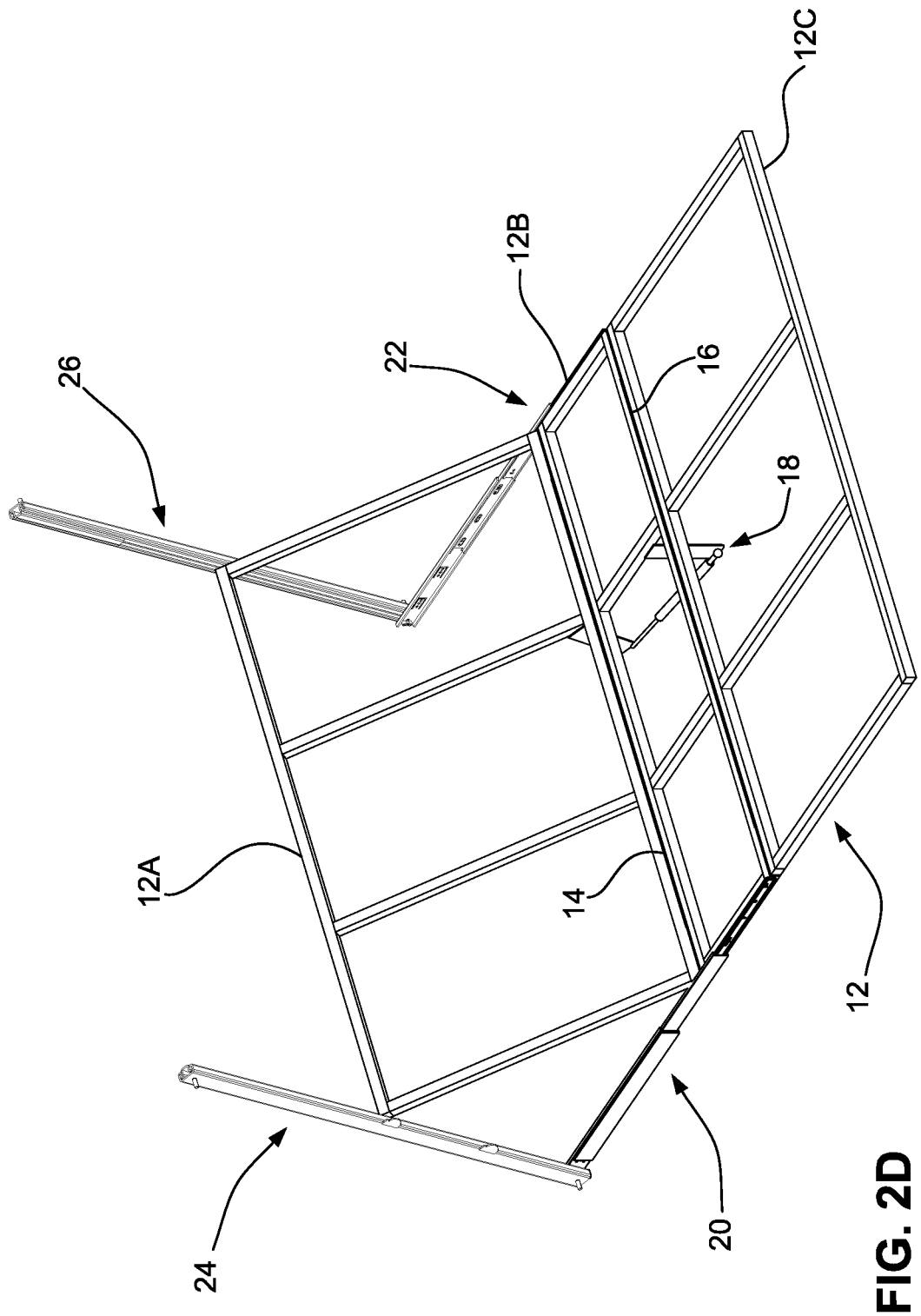
FIG. 2D is a perspective view of the folding bed system of FIG. 1A in the intermediate configuration with the mattress removed.
Figure 3A:
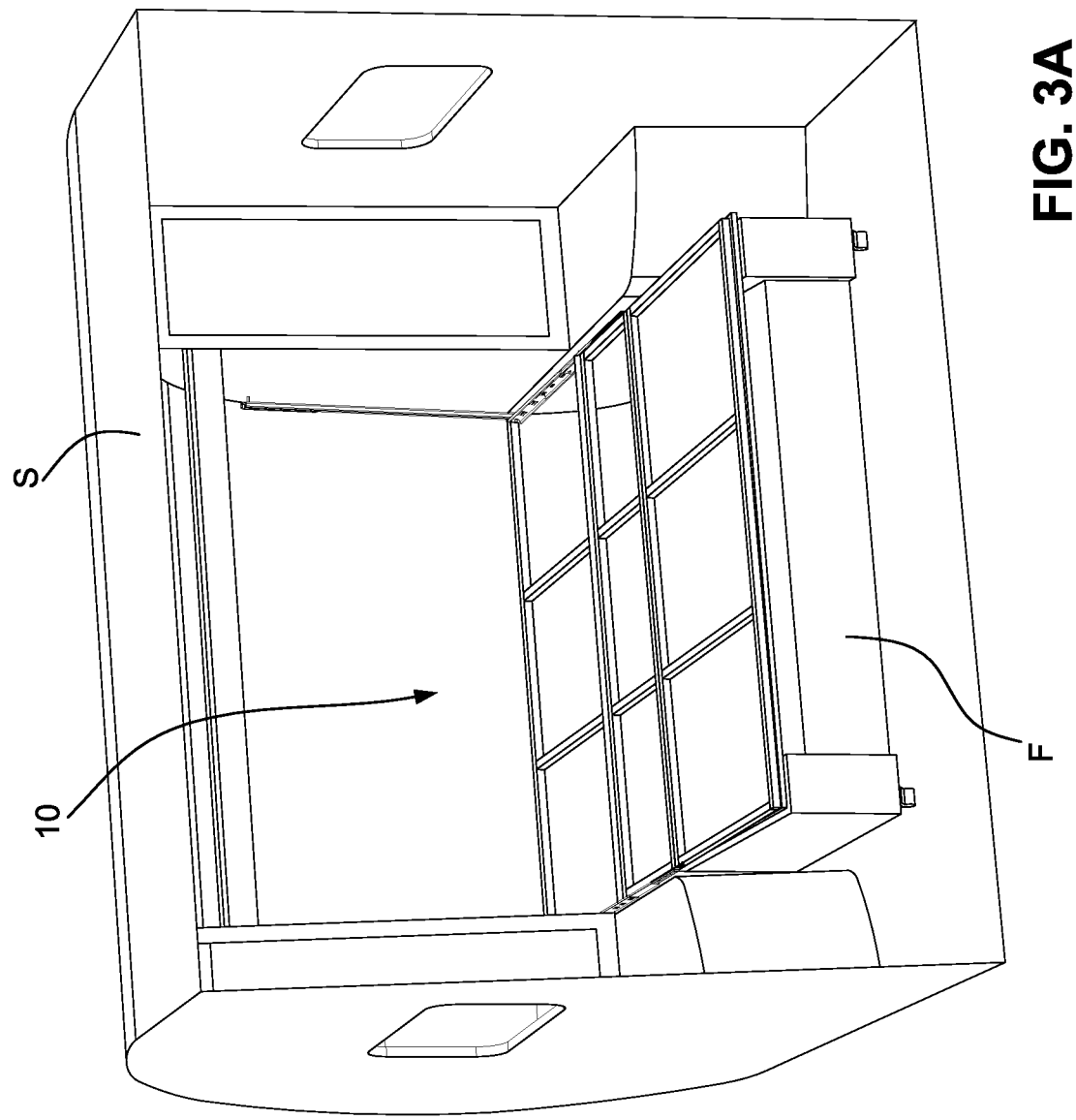
FIG. 3A is a perspective view of the folding bed system of FIG. 1A installed in the structure and combined with the article of furniture, with the folding bed system in a fully deployed configuration.
Figure 3B:
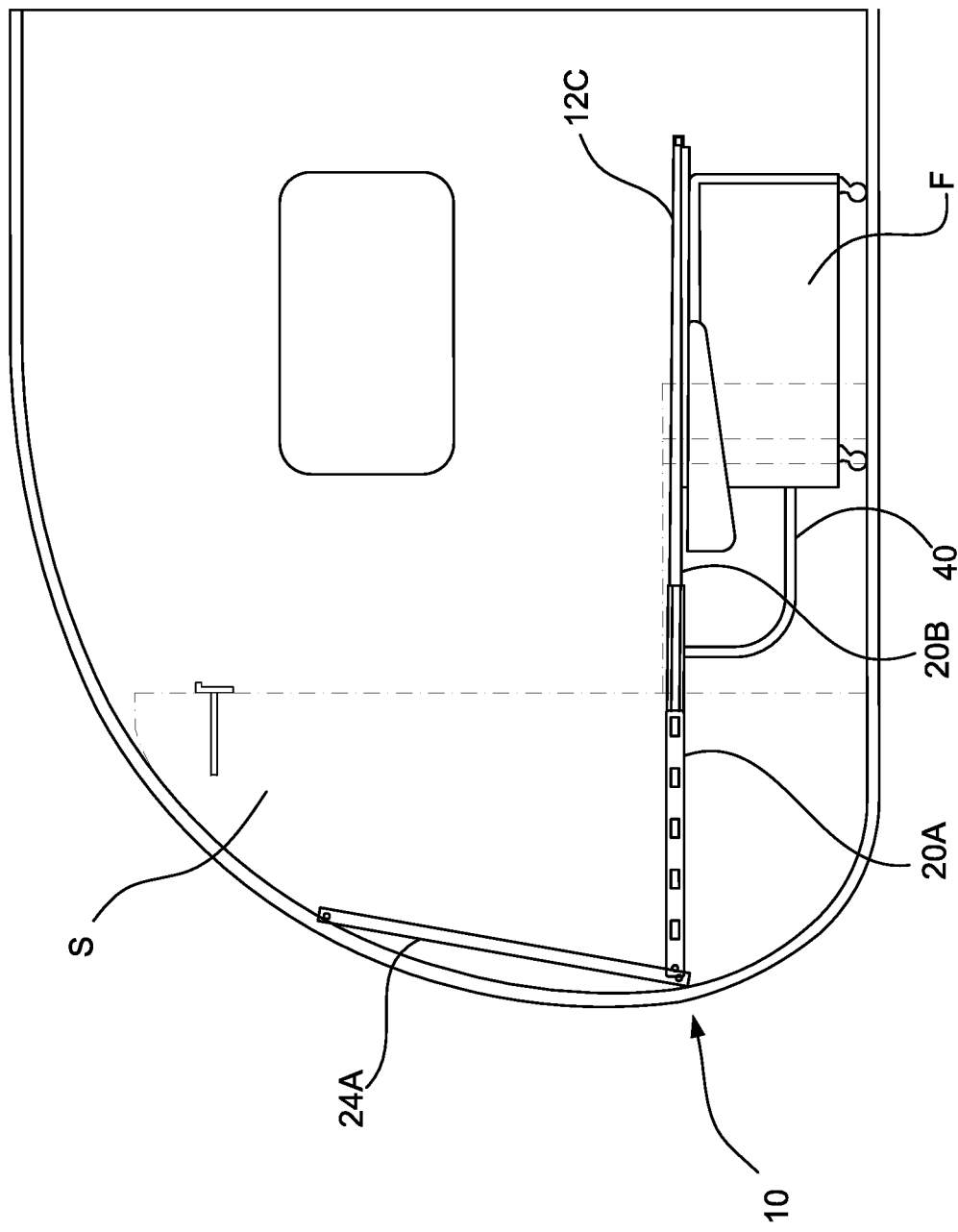
FIG. 3B is an end elevation view of the folding bed system, structure, and article of furniture of FIG. 1A, with the folding bed system in the fully deployed configuration.
Figure 3C:
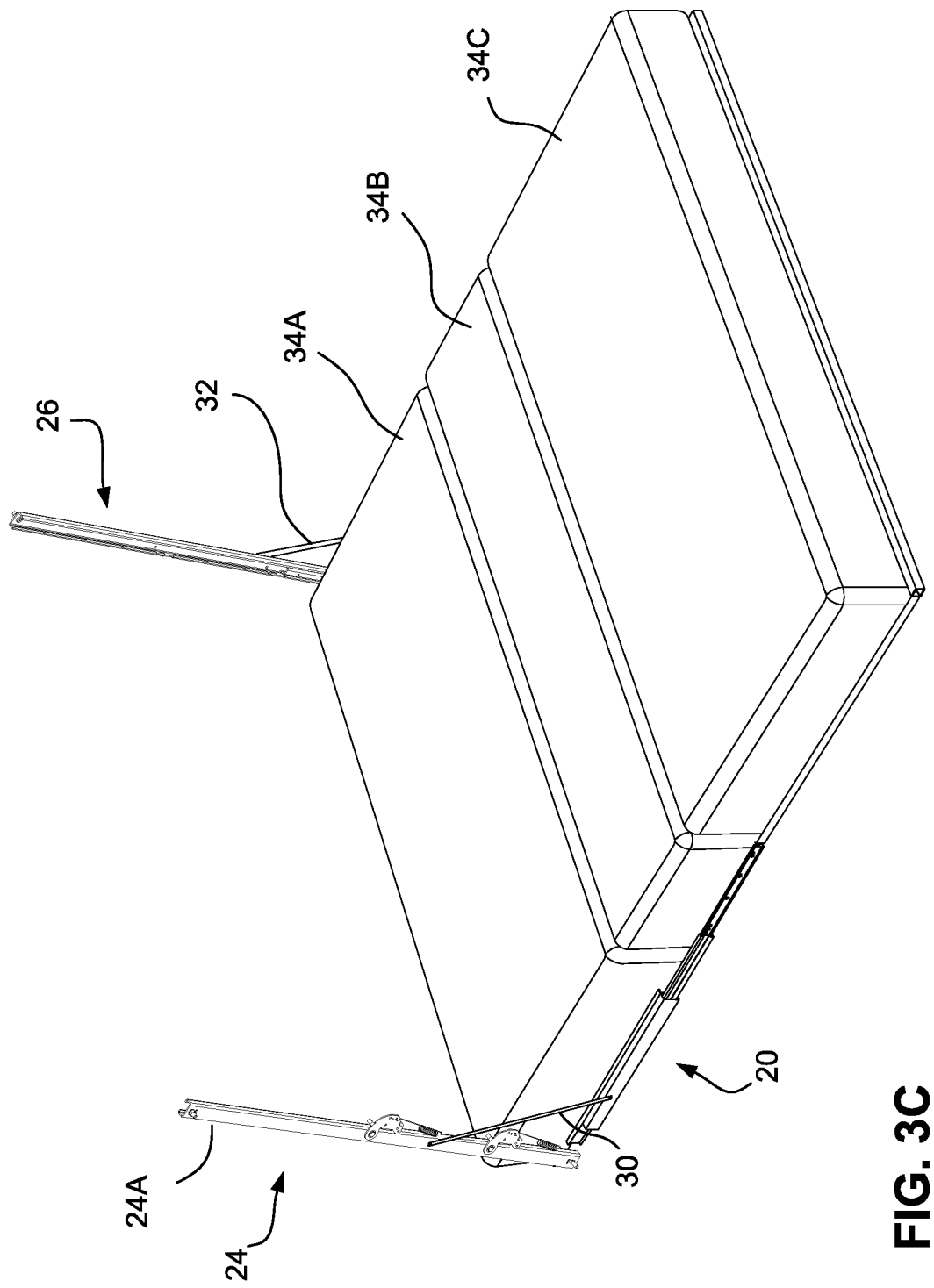
FIG. 3C is a perspective view of the folding bed system of FIG. 1A in the fully deployed position.
Figure 3D:
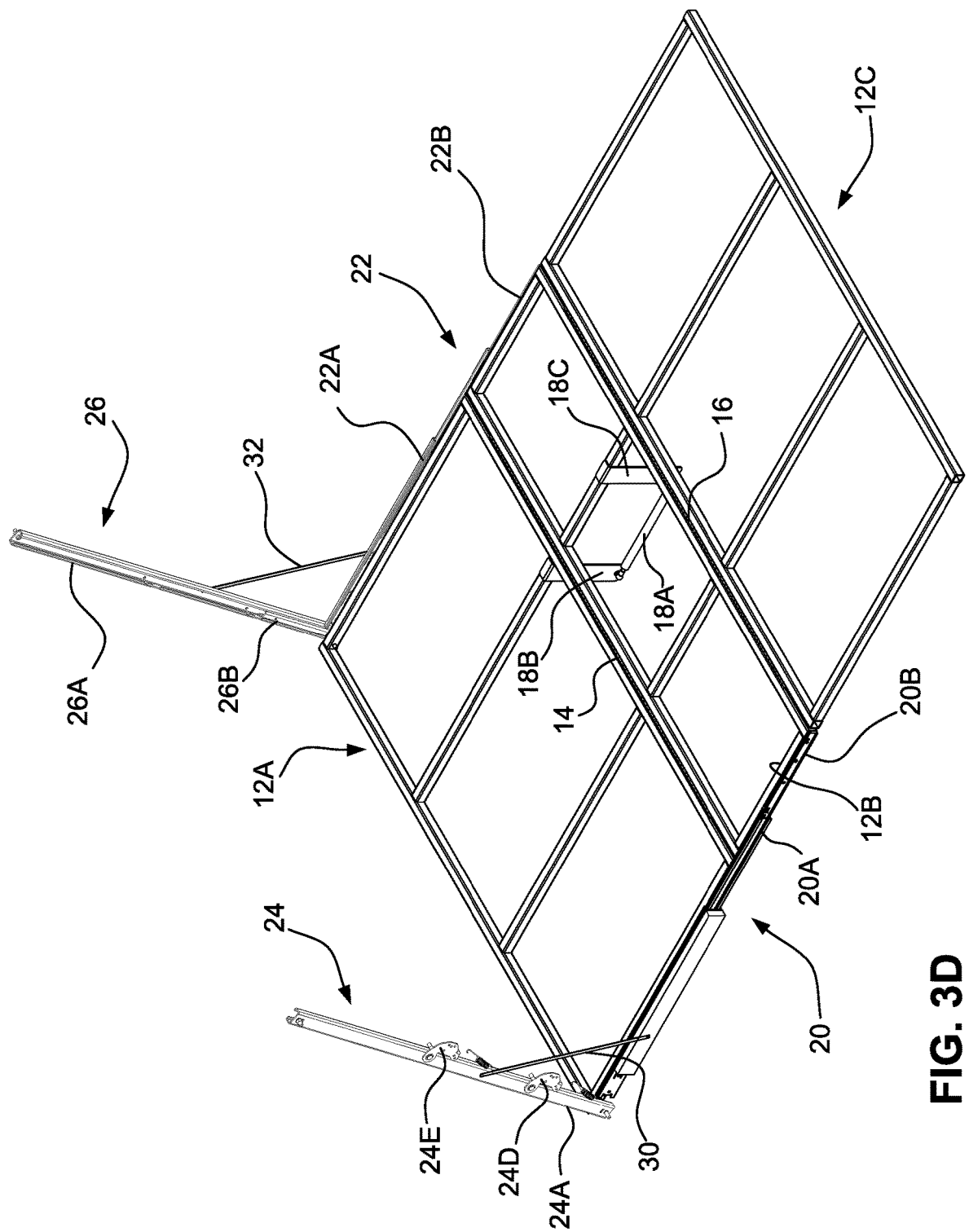
FIG. 3D is a perspective view of the folding bed system of FIG. 1A in the fully deployed configuration with the mattress removed.
Figure 3E:
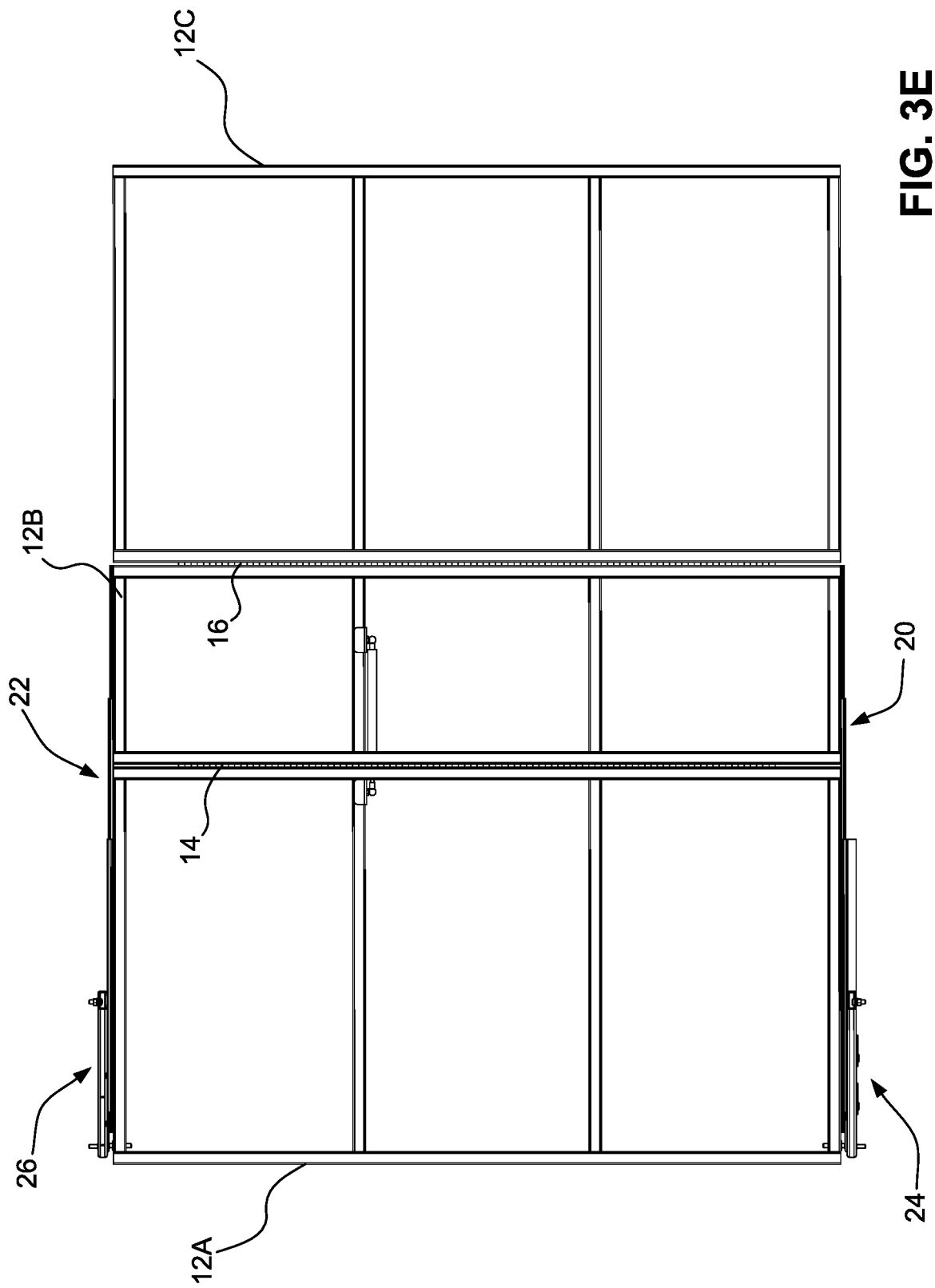
FIG. 3E is a top plan view of the folding bed system of FIG. 1A in the fully deployed configuration with the mattress removed.
Figure 4A:
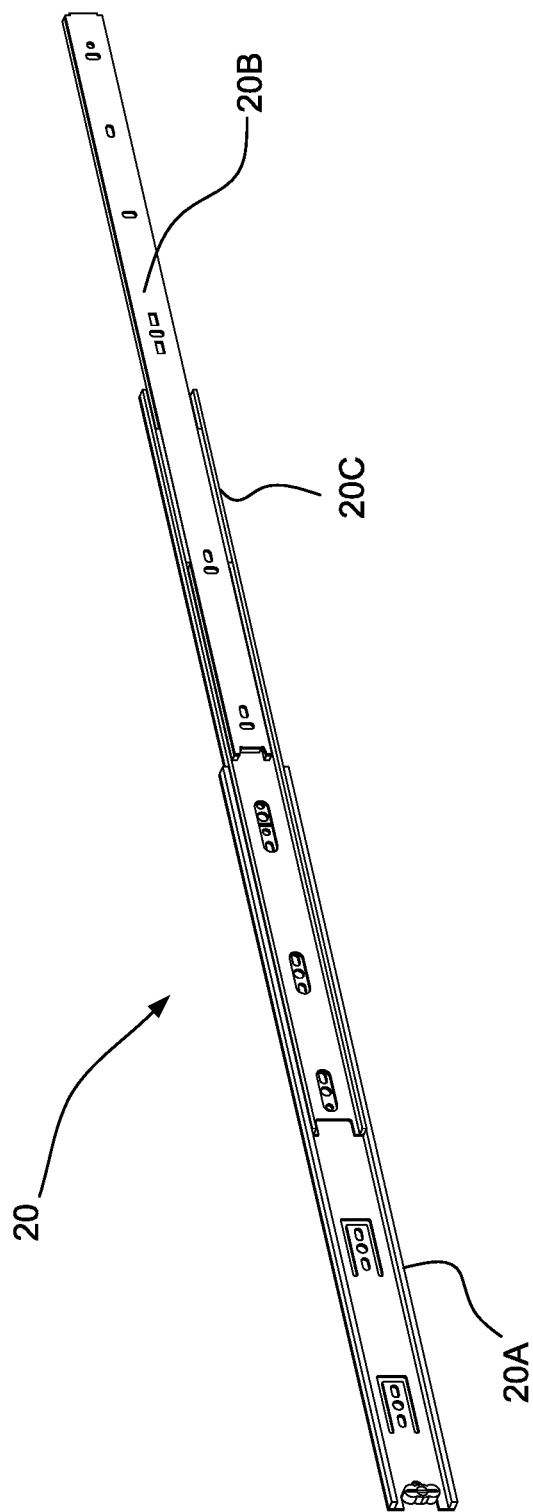
FIG. 4A is a perspective view of a first side slide mechanism of the folding bed system of FIG. 1A, in an extended configuration.
Figure 4B:
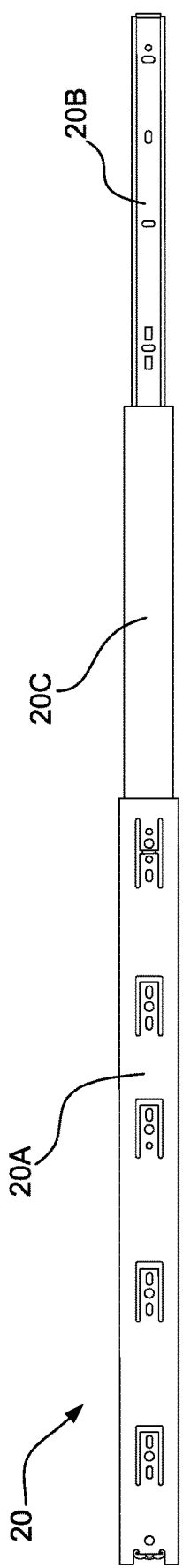
FIG. 4B is an outside elevation view of the first side slide mechanism of FIG. 4A, in an extended configuration.
Figure 4C:
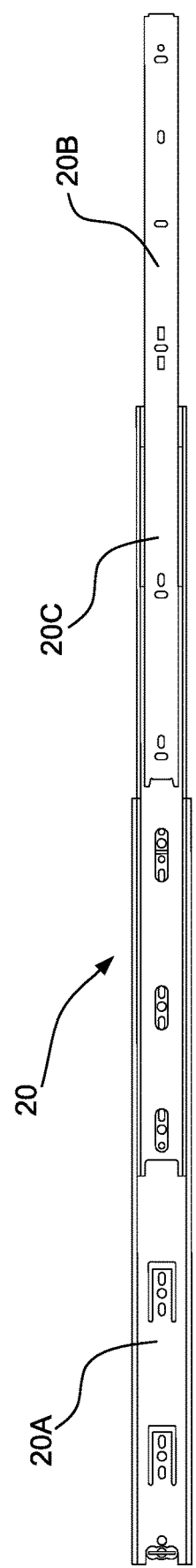
FIG. 4C is an inside elevation view of the first side slide mechanism of FIG. 4A, in an extended configuration.
Figure 4D:
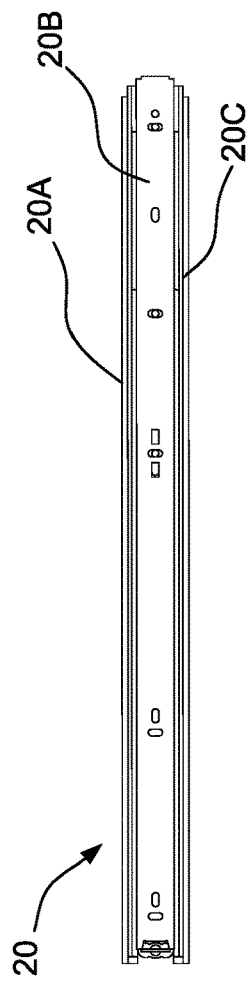
FIG. 4D is an inside elevation view of the first side slide mechanism of FIG. 4A, in a retracted configuration.
Figure 5A:
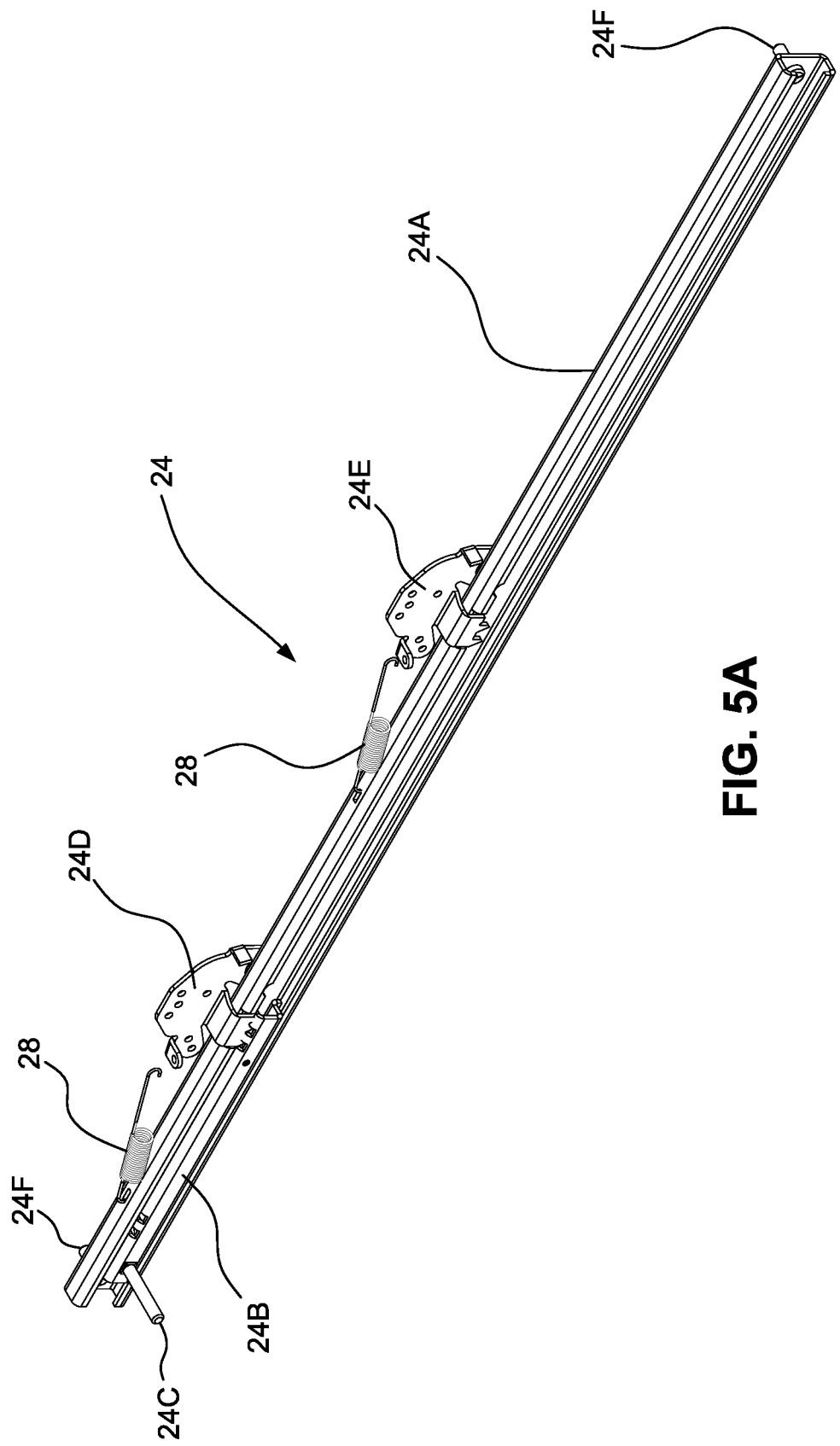
FIG. 5A is perspective view of a first side guide mechanism of the folding bed system of FIG. 1A.
Figure 5C:
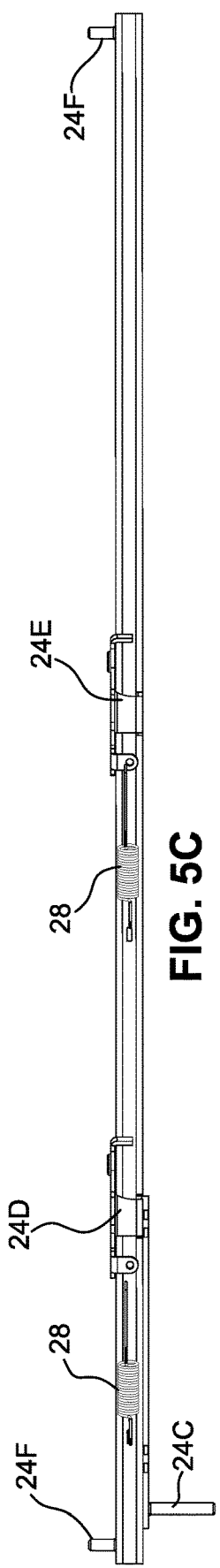
FIG. 5C is a top plan view of the first side guide mechanism of FIG. 5A.
Figure 5B:
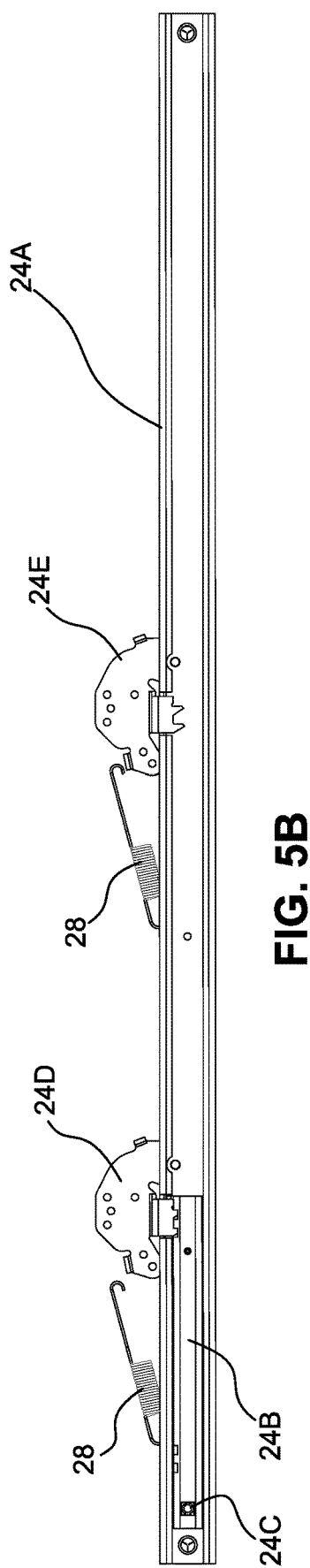
FIG. 5B is a side elevation view of the first side guide mechanism of FIG. 5A.
Figure 5D:
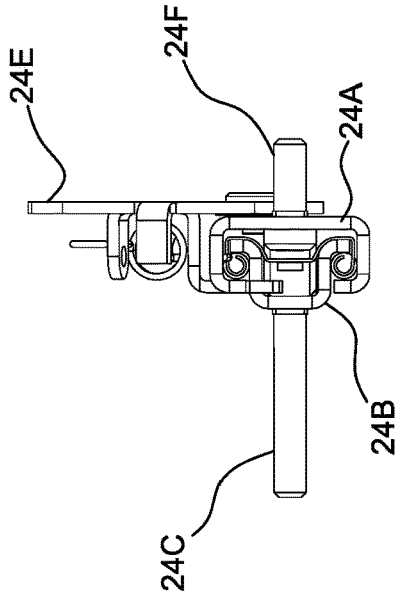
FIG. 5D is an end elevation view of the first side guide mechanism of FIG. 5A.
Figure 6A:
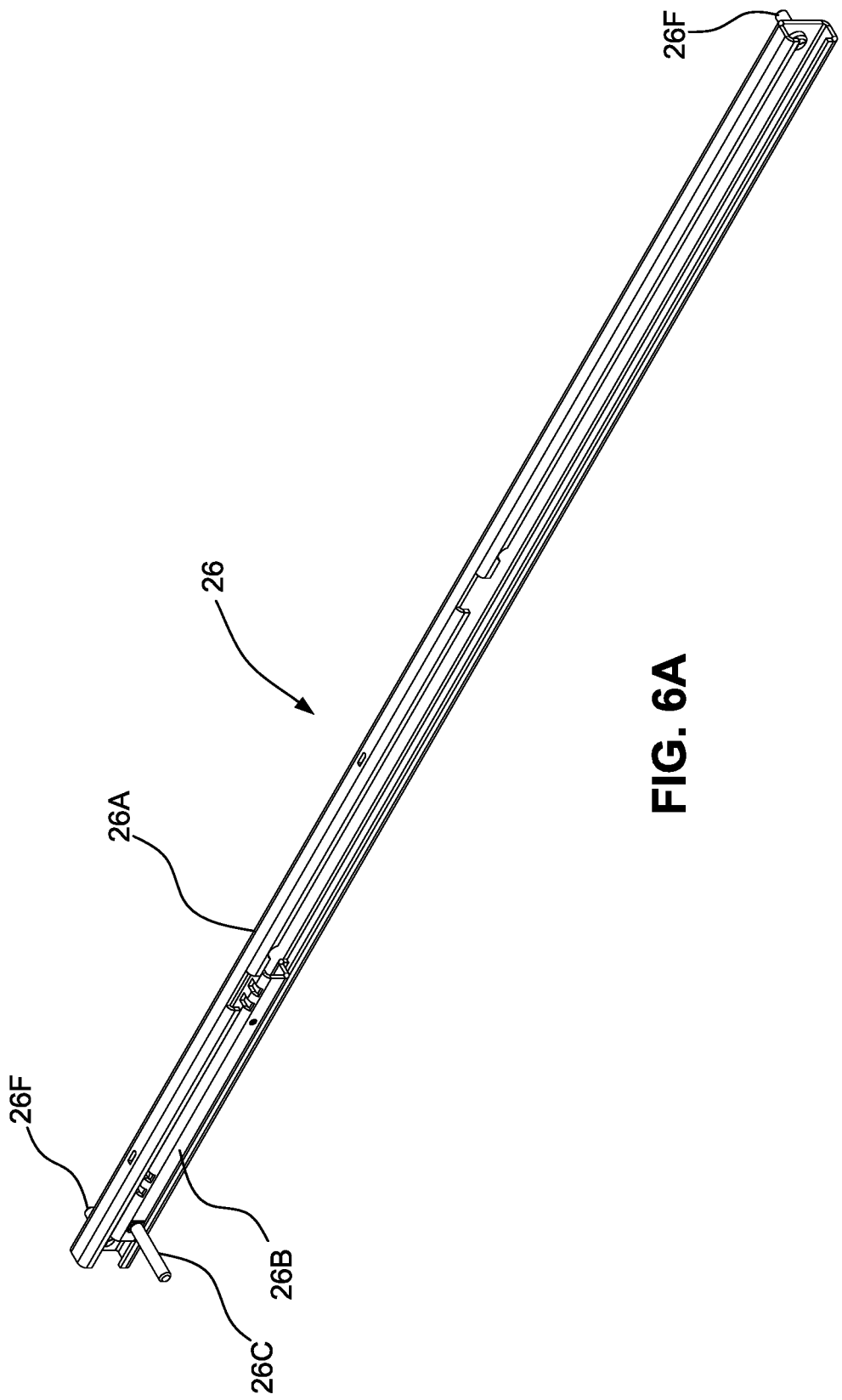
FIG. 6A is perspective view of a second side guide mechanism of the folding bed system of FIG. 1A.
Figure 6C:
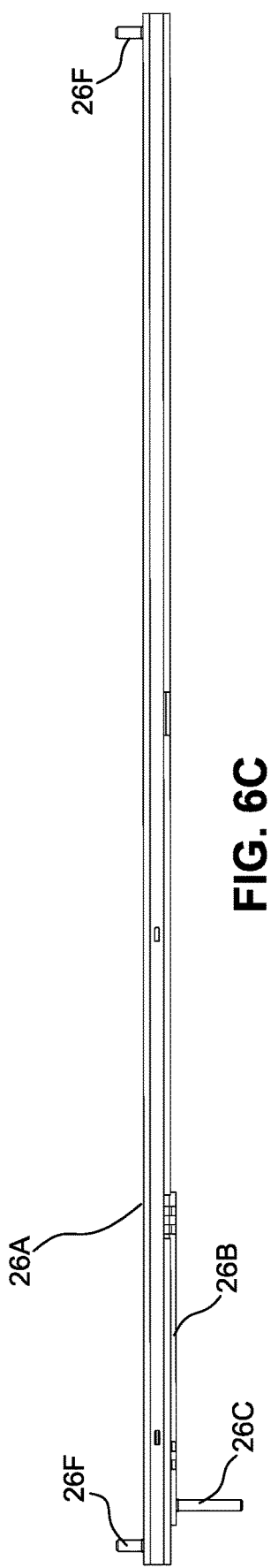
FIG. 6C is a top plan view of the second side guide mechanism of FIG. 6A.
Figure 6B:
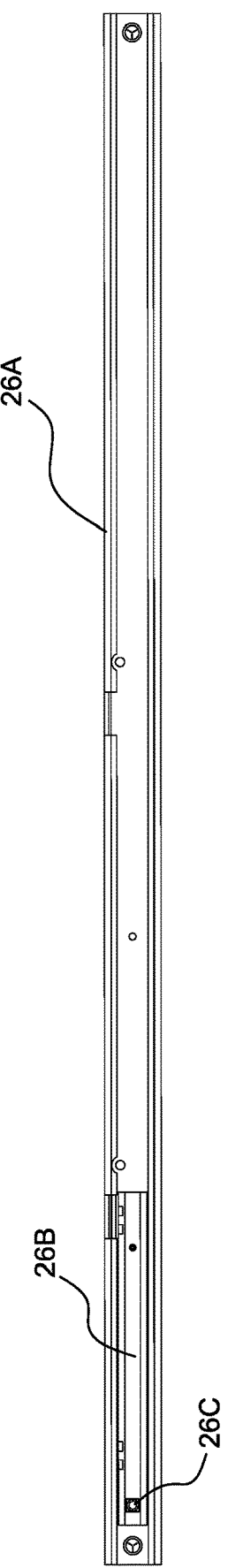
FIG. 6B is a side elevation view of the second side guide mechanism of FIG. 6A.
Figure 6D:
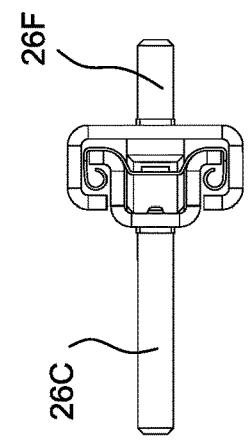
FIG. 6D is an end elevation view of the second side guide mechanism of FIG. 6A.

The head section 12A is pivotable with respect to the center section 12B between a stowed position wherein the head section is at a first angle α with respect to the center section (as best shown in FIG. 1C) and a fully deployed or flat position with respect to the center section (as best shown in FIG. 3C). The first angle α may be about 90° or a greater or lesser angle, for example, any angle between about 45° and about 135°. In an embodiment, the angle α may be about 73.5°.

The foot section 12C is pivotable with respect to the center section 12B between a stowed position wherein the foot section is at a second angle β with respect to the center section (as best shown in FIG. 1C) and a fully deployed or flat position with respect to the center section (as best shown in FIG. 3C). The second angle β may be about 90° or a lesser or greater angle, for example, any angle between about 85° and about 95° or lesser or greater angles.

A biasing mechanism 18 may be provided to bias the head section 12A from the fully deployed position toward the stowed position. As shown, the biasing member 18 includes a gas strut 18A connected between a first lever arm 18B depending from a cross bar of the head section 12A and a second lever arm 18C depending from a cross bar of the center section 12B. In other embodiments, the biasing mechanism could take other forms and could be connected between the head section 12A and the center section 12B in different ways.

A first slide mechanism 20 is connected to the first side of the center section 12B, and a second slide mechanism 22 is connected to the second side of the center section.

As best shown in FIGS. 4A-4D, the first slide mechanism 20 includes a first guide rail 20A configured for connection to the structure, and a first slide rail 20B connected to the first side of the center section 12B, and an intermediate rail 20C disposed between the guide rail and the slide rail. The slide rail 20B is slidingly engaged with the intermediate rail 20C, and the intermediate rail is slidingly engaged with the guide rail 20A. Each of the first guide rail 20A, the first slide rail 20B, and the first intermediate rail 20C has a first (or head) end and a second (or foot) end. The first slide mechanism 20 may be embodied as a heavy-duty drawer slide or the like. In an embodiment, the intermediate rail 20C could be omitted. In such an embodiment, the slide rail 20B would be slidingly engaged with the guide rail 20A.

The second slide mechanism 22 may be identical to or the mirror image of the first slide mechanism 20. As such, the second slide mechanism 22 will be not be discussed in detail herein. Components of the second slide mechanism 22 having counterparts in the first slide mechanism 20 may be referred to herein or identified in the drawings using like reference characters, incremented by 2.

A first guide mechanism 24 is associated with the first slide mechanism 20 and with the first side of the head end of the head section 12A. A second guide mechanism 26 is associated with the second slide mechanism 22 and with the second side of the head end of the head section 12A.

As best shown in FIGS. 5A-5D, the first guide mechanism 24 includes a first guide track 24A and a first slider 24B slidingly engaged within the first guide track. Each of the first guide track 24A and the first slider 24B has a first (or deployed or lower) end and a second (or stowed or upper) end. A first engagement member 24C extends from the first slider 24B in a direction away from the first guide track 24A and generally perpendicular to the direction of travel of the first slider with respect to the first guide track. The first engagement member 24C is configured to be pivotably received within a corresponding receiver associated with the head section 12A. The receiver may be embodied, for example, as an aperture defined by the first side of the head section 12A (as shown) or a boss connected to or otherwise associated with the first side of the head section.

The first guide mechanism 24 also includes a first latch 24D configured to selectively latch the first slider 24B in a first position with the first guide track 24A, and a second latch 24E configured to selectively latch the first slider in a second position with the first guide track 24A. The first position may be near a first end of the first guide track 24A, and the second position may be near a midpoint of the first guide track 24A. The first guide mechanism 24 may further include a third latch (not shown) configured to selectively latch the first slider 24B in a third position with the first guide track 24A. The third position may be near a second end of the first guide track 24A. Any or all of the first and second latches 24D, 24E and the third latch (if provided) may be provided with a corresponding spring 28 or other biasing mechanism configured to automatically latch the first slider 24B in the respective position as the first slider slides to the respective position with respect to the first guide track 24A. Each of the latches 24D, 24E (and the third latch, if provided) may be selectively released to unlatch the first slider 24B from the respective position with respect to the first guide track 24A. A remote release, for example, a pull cord or cable, (not shown) may be provided to allow a user to remotely unlatch the first slider 24B from the respective latches.

The first guide mechanism 24 may include pins 24F extending from the first guide track 24A proximate opposite ends thereof in a direction away from the first slider 24B and generally perpendicular to the direction of travel of the first slider with respect to the first guide track. The pins 24F may be inserted into predrilled holes of a wall of the structure S to locate the first guide track 24A with respect thereto.

As best shown in FIGS. 6A-6D, the second guide mechanism 26 may be identical to or the mirror image of the first guide mechanism 24, except that the second guide mechanism does not include any counterparts to the latches described above in connection with the first guide mechanism 24. As such, the second guide mechanism 26 will not be discussed in detail herein. In an embodiment, however, the second guide mechanism 26 could include counterparts to the latches described above in connection with the first guide mechanism 24, and such counterpart latches could have functionality the same as or similar to the functionality of the latches described above in connection with the first guide mechanism 24. Components of the second guide mechanism 26 having counterparts in the first guide mechanism 24 may be referred to herein or identified in the drawings using like reference characters, incremented by 2.

A first set strap 30 may be permanently or temporarily connected or connectable to the first guide rail 20A at a predetermined location and to the first guide track 24A at a predetermined location. A second set strap 32 may be connected between analogous components of the second slide mechanism 22 and the second guide mechanism 26. The first and second set straps 30, 32, may facilitate integration of the folding bed system 10 into the structure, as will be discussed further below. In an embodiment, the first set strap 30 could be a light gauge, elongated steel strap defining at least two longitudinally-separated apertures configured to receive corresponding fasteners. The first guide rail 20A and the first guide track 24A may define complementary apertures configured to receive the corresponding fasteners. The second set strap 32, the second guide rail 22A, and the second guide track 26A could be similarly configured.

The folding bed system 10 may also include a folding mattress 34 having a head section 34A, a center section 34B, and a foot section 34C, with each of the head section 34A, the center section 34B, and the foot section 34C having a head end, a foot end, a first side, and a second side. The foot end of the head section 34A may be pivotably connected to the head end of the center section 34B at a first pivot axis 36. The foot end of the center section 34B may be pivotably connected to the head end of the foot section 34C at a second pivot axis 38. Alternatively, any or all of the head section 34A, the center section 34B, and the foot section 34C could be independent of the others of the head section, the center section, and the foot section. Each section 34A, 34B, 34C of the folding mattress 34 may be connected to the corresponding section 12A, 12B, 12C of the folding bed frame 12, for example, using straps (not shown).

The folding bed system 10 may include a connector 40 connected or connectable to the bed frame 12, for example, to the center section 12B of the bed frame, and connected or connectable to the article of furniture F so that lateral movement of the article of furniture in a direction parallel to the direction of extension and retraction of the slide rails 20B, 22B with respect to the guide rails 20A, 22A results in extension and retraction of the slide rails with respect to the guide rails.

As suggested above, the folding bed system 10 may be integrated into a structure S, for example, a cabinet or walls of an RV. The first set strap 30 may be connected to the first guide rail 20A and the first guide track 24A at predetermined locations thereof.

The first guide rail 20A may be connected (using fasteners or other means) to a wall of the structure S, substantially parallel to and elevated from a floor of the structure S or a floor upon which the structure may be placed. The first end of the first guide track 24A may be placed in abutment with (or in another predetermined position with respect to) the first end of the first guide rail 20A in a predetermined or otherwise desired orientation. With the first end of the first guide track 24A so placed with respect to the first end of the first guide rail 20A, the first set strap 30 cooperates with the first guide track 24A and the first guide rail 20A to place the first guide track at a third angle γ with respect to the first guide rail. The third angle γ may be selected. In an embodiment, the third angle γ may be about 73.5°. In other embodiments, the angle γ may be a lesser or greater angle, for example, any angle between about 45° and about 135° or a lesser or greater angle.

With the first guide track 24A so placed, the first guide track may be connected to the wall (using fasteners or other means). Analogous components of the second slide mechanism 22 and the second guide mechanism 26 may be connected to another, opposing wall, of the structure S in an analogous manner.

In an embodiment, the first guide track 24A could be connected to the wall before the first slide rail 20A is connected to the wall. In an embodiment, the first guide track 24A could be located to the wall by drilling into the wall holes corresponding to the pins 24F in a desired, predetermined orientation. The pins 24F could then be inserted into the holes, thereby locating the first guide track 24A to the wall. The first slide rail 20A could then be located to the wall, using the first set strap 30 in a manner similar to that discussed above.

In an embodiment, the first set strap 30 could be omitted, and the first guide rail 20A and the first guide track 24A could be connected to the wall in any desired manner.

The first and second slide rails 20B, 22B may be connected to the first and second sides, respectively, of the center section 12B of the bed frame 12.

The first slide rail 20B may be engaged with the first guide rail 20A, and the first engagement member 24C may be engaged with the first receiver. The analogous components of the second slide mechanism 22 and the second guide mechanism 26 may be analogously integrated with each other. Stops (not shown) could be installed in the first and second slide mechanisms 20, 22 to prevent inadvertent overextension of the slide rails with respect to the guide rails thereof.

The engagement members 24C, 26C may be engaged with the corresponding receivers associated with the head section 12A.

The mattress 34 may be disposed upon the bed frame 12 and secured thereto.

In embodiments including the article of furniture F, the connector 40 may be connected to the bed frame 12 and to the article of furniture.

The foregoing installation of the folding bed system to the structure may be performed in any desired order.

In use, the folding bed system 10 may be placed in the fully deployed configuration shown in FIGS. 3A-3D, wherein the head, center, and foot sections 12A, 12B, 12C of the frame 12 and the head, center, and foot sections 34A, 34B, 34C of the mattress 34 (or at least upper surfaces thereof) are generally coplanar and parallel to the floor of the structure S or an underlying floor.

With the folding bed system 10 in the fully deployed configuration, the first side of the center section 12B is supported by the first slide mechanism 20 through interaction of the first side of the center section with the first slide rail 20B (which is extended from the first guide rail 20A and the intermediate rail 20C, if provided) and through interaction of the first slide rail 20B with the first guide rail 20A. The second side of the center section 12B is supported by the second slide mechanism 22 in an analogous manner.

Also, the first side of the head section 12A proximate the head end thereof is supported by the first guide mechanism 24 through interaction of the head section 12A with the first engagement member 24C, interaction of the first engagement member 24C with the first slider 24B, and interaction of the first slider with the first guide track 24A by virtue of the first engagement member 24C being secured by the first latch 24D. The second side of the head section 12A proximate the first end thereof is supported by the second guide mechanism 26 in an analogous manner. The foot end of the head section 12A is supported by the center section 12B through the first hinge 14.

Further, the head end of the foot section 12C is supported by the center section 12B through the second hinge 16. The foot section 12C distant from the second hinge 16 is supported by the floor through interaction with the intervening article of furniture, as shown in FIG. 3A, through optional leg(s) (not shown) as discussed above, or otherwise.

The folding bed system 10 may be transitioned from the fully deployed configuration to an intermediate configuration wherein the center and foot sections 12B, 12C of the frame 12 and the center and foot sections 34B, 34C of the mattress 34 or at least upper surfaces thereof are generally coplanar and parallel to the floor of the structure S, and wherein the head sections 12A, 34A of the frame 12 and the mattress 34 are inclined with respect to the center sections 12B, 34B and the foot sections 12C, 34C thereof. This may be accomplished by unlatching the first latch 24D, thereby releasing the first engagement member 24C therefrom (and by unlatching a counterpart latch, if any, of the second guide mechanism 26, thereby releasing the second engagement member 26C therefrom), thereby allowing the first and second sliders 24B, 26B to slide with respect to the first and second guide tracks 24A, 26A, respectively.

A lateral force may be applied, directly or indirectly to any section 12A, 12B, 12C of the bed frame 20 in the direction of the head ends of the first and second guide rails 20A, 22A. Consequently, the slide rails 20B, 22B (and/or the intermediate rails 20C, 22C, if provided) will slide with respect to the corresponding guide rails 20A, 22A, the biasing mechanism 18 will cause the head section 12A to pivot out-of-plane with respect to the center section 12B, toward the stowed position, and the sliders 24B, 26B will slide with respect to the corresponding guide tracks 24A, 26A toward the second ends thereof. Eventually, the first engagement member 24C will interact with the second latch 24E and become latched thereto, thereby securing the folding bed system 10 in the intermediate configuration.

The folding bed system 10 may be transitioned from the intermediate configuration to the stowed configuration by unlatching the second latch 24E, thereby releasing the first engagement member 24C therefrom and applying a further lateral force to the bed frame 12, thereby causing the slide rails 20B, 22B (and/or the intermediate rails 20C, 22C, if provided) to further slide with respect to the corresponding guide rails 20A, 22A, causing the head section 12A to pivot further out-of-plane with respect to the center section 12B, to the stowed position, and causing the sliders 24B, 26B to slide further with respect to the corresponding guide tracks 24A, 26A to a fully retracted position. Eventually, the first engagement member 24C will interact with the third latch, if provided, and become latched thereto. The foot sections 12C, 34C of the frame 20 and the mattress 34 may be pivoted to the stowed position, as described above. A further latch (not shown) may be provided to secure the foot section 12C of the frame 12 to the structure S.

The folding bed system 10 may be transitioned from the stowed position to the intermediate and fully deployed positions by reversing the foregoing steps and direction of application of lateral force.

In embodiments including the connector 40 and the article of furniture F, the lateral forces referred to above may be applied indirectly to the bed frame 12 through the article of furniture F and the connector 40.

As shown, the article of furniture F is a sofa. In other embodiments, the article of furniture F could be a table or another type of furniture.

Figure 7:
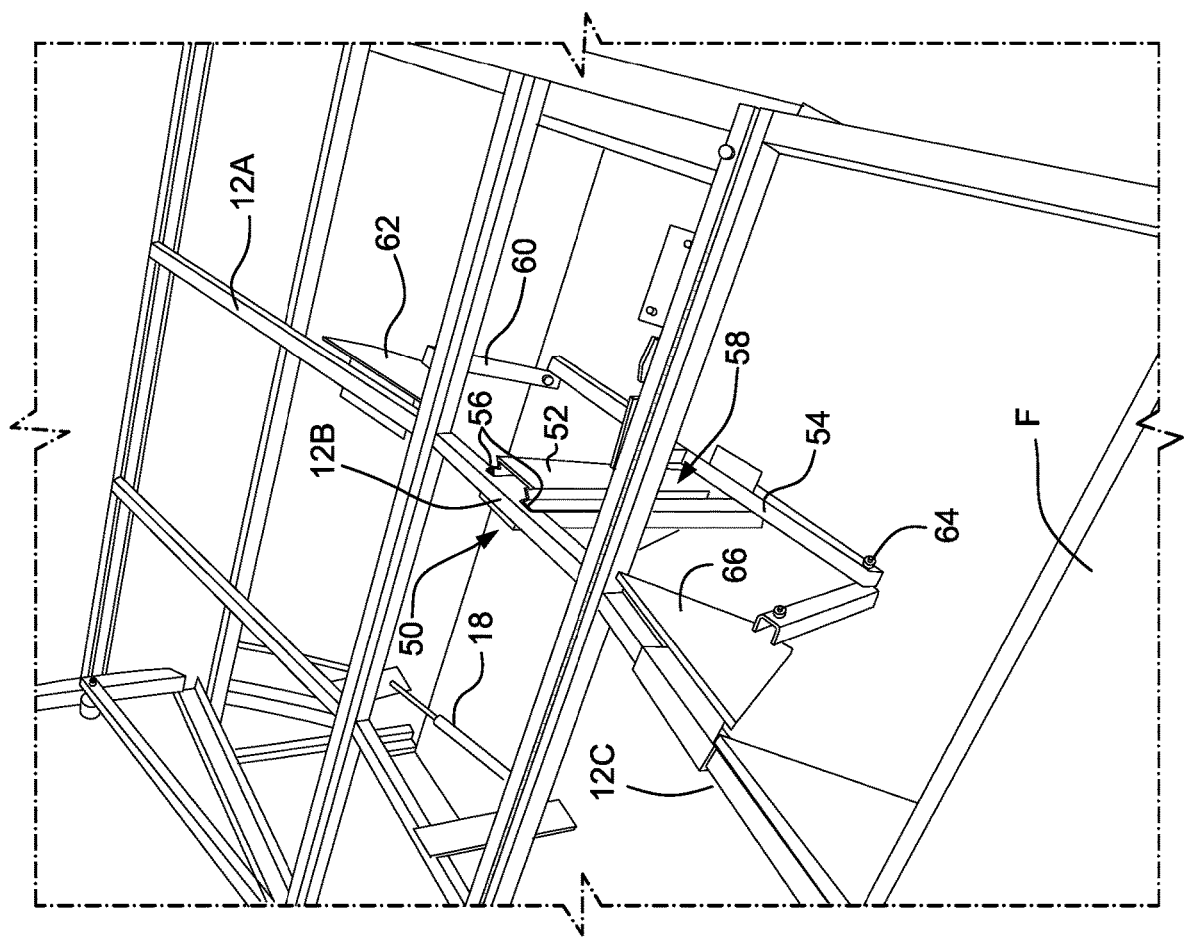
FIG. 7 shows a hinge assembly of an alternative embodiment that assists the folding and unfolding of both sides of the frame.
Figure 8:
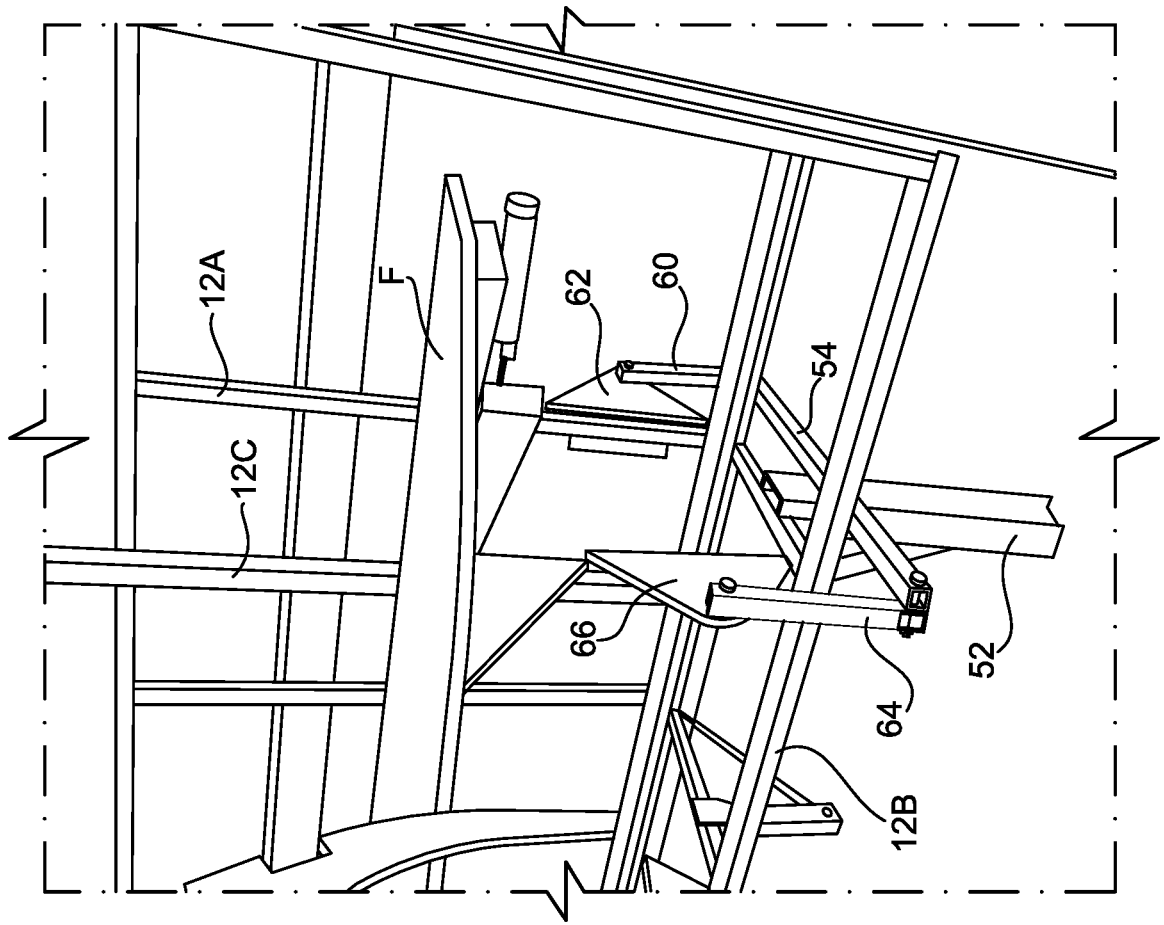
FIG. 8 shows the hinge assembly of FIG. 7 in a stowed position.

FIGS. 7 and 8 show a variation of the folding bed frame incorporating a hinge assembly 50 that assists in folding and unfolding the head section 12A and the foot section 12C relative to the center section 12B. The hinge assembly 50 includes a center post 52 securable to the center section 12B. A connecting bracket 54 is movably coupled with the center post 52. Specifically, the connecting bracket 54 is vertically displaceable on the center post 52 between a down position (FIG. 7) and an up position (FIG. 8). The center post 52 constitutes a track member defining at least one vertical track 56. In some embodiments, the center post 52 defines two vertical tracks 56 including a forward facing vertical track and an aft facing vertical track. A roller unit 58 is coupled with the connecting bracket 54 and engages the vertical tracks 56. Specifically, the roller unit 58 includes a pair of facing rollers engaging the two vertical tracks 56, essentially sandwiching the center bracket 52. FIG. 7A is a close-up view of an alternative roller unit 58' with rollers 59' vertically aligned in an interior track 56' in the center post 52'.

A forward bracket 60 is pivotably secured at one end to the connecting bracket 54 and pivotably secured at an opposite end to the head section 12A through a first frame connector 62. That is, the forward bracket 60 is pivotably connected to the first frame connector 62, which is fixed to the head section 12A. An aft bracket 64 is pivotably secured at one end to the connecting bracket 54 and pivotably secured at an opposite end to the foot section 12C via a second frame connector 66.

With the bed frame in the deployed position as shown in FIG. 7, when the furniture F is displaced to pivot the foot section 12C relative to the middle section 12B from the deployed position toward the stowed position (either manually by an operator or via a motorized drive or the like), the foot section 12C displaces the aft bracket 64 in the pivoting direction of the foot section 12C, which in turn displaces the connecting bracket 54 upward on the center post 52. As the connecting bracket 54 is displaced upward on the center post 52, the connecting bracket 54 displaces the forward bracket 60 to simultaneously pivot the head section 12A relative to the middle section 12B. As shown, the connecting bracket 54 is in its low position with the head section 12A and the foot section 12C in their respective deployed positions. As shown in FIG. 8, as the foot section 12C is fully pivoted to its stowed position, the connecting bracket 54 is displaced up the center post 52 to its up position, in which the head section 12A is also pivoted to its stowed position.

The biasing mechanism 18 is secured between the center section 12B and the head section 12A. In an exemplary construction, as discussed above, the biasing mechanism 18 may be a gas spring. The biasing mechanism acts to bias the head section 12A toward its stowed position (FIG. 8). The biasing mechanism 18 is configured such that a weight of the head section 12A is greater than the biasing force. The biasing mechanism 18 thus assists in positioning the bed frame, the head section 12A in particular, in its stowed position. The assembly may include a second biasing mechanism on an opposite side of the bed frame.

Figure 9:
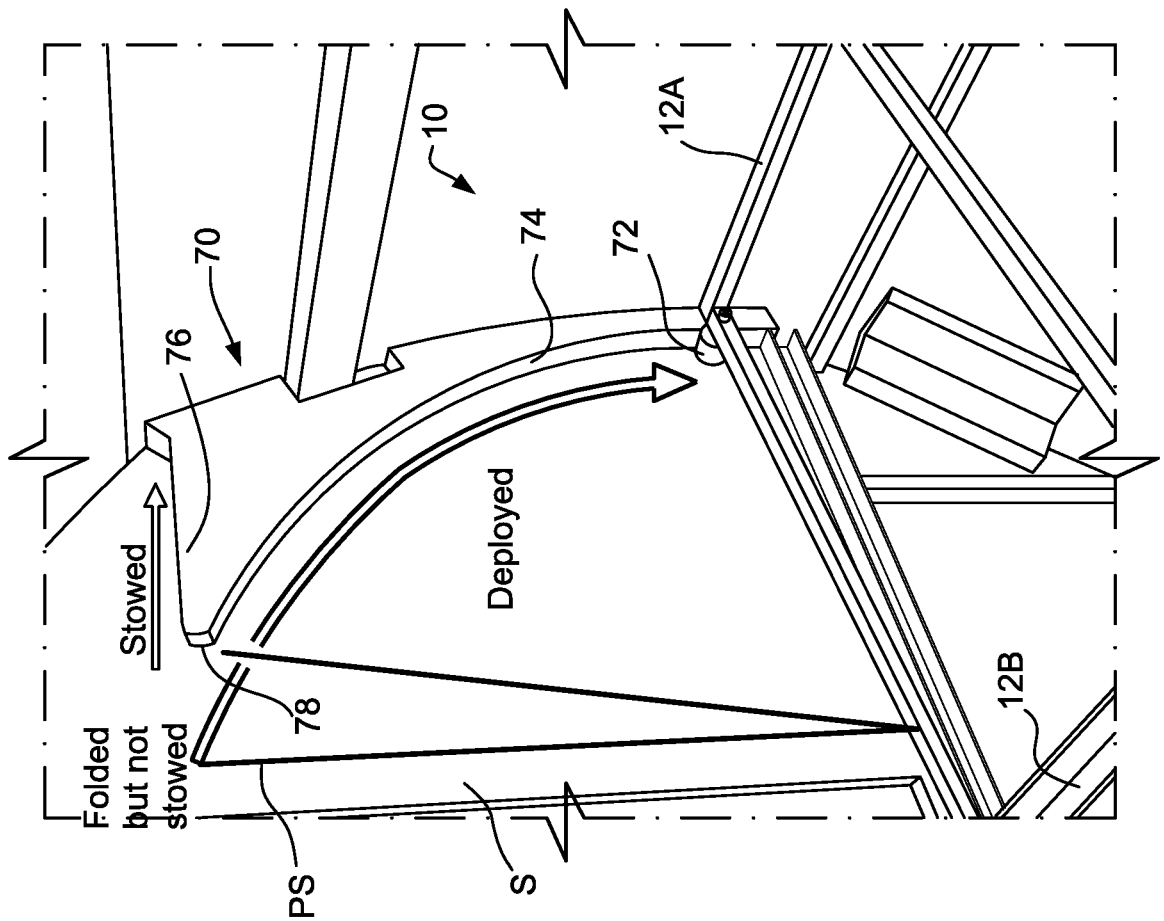
FIG. 9 shows the inside of a housing structure for a folding bed frame including a roller track with the bed frame in a deployed position.
Figure 10:
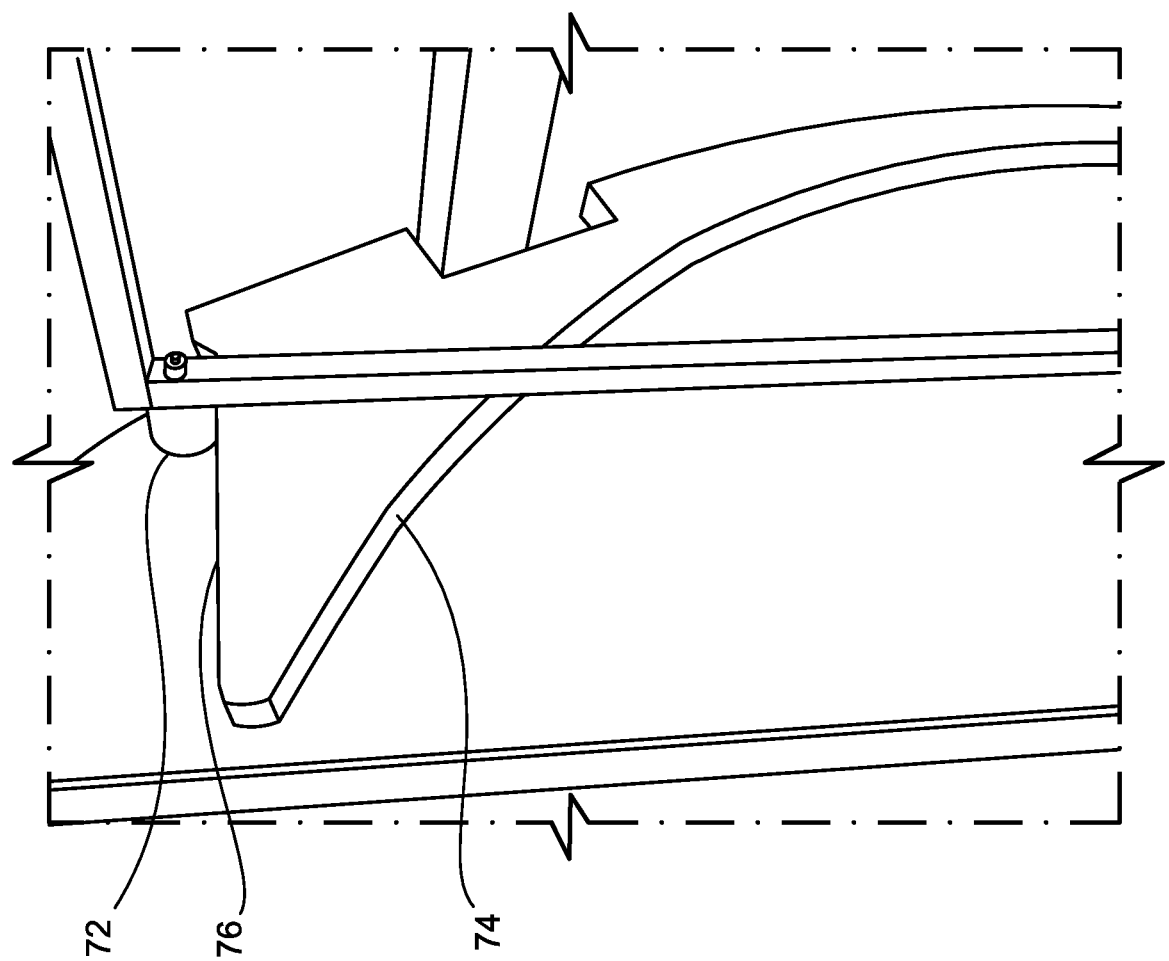
FIG. 10 shows the roller track of FIG. 9 with the bed frame in a stowed position.

FIGS. 9 and 10 show a variation incorporating roller tracks 70 in the housing structure S. In this variation, the head section 12A is provided with rollers 72 at respective forward corners thereof. Only one side of the assembly is shown in FIG. 9, it being understood that identical structure is positioned on the opposite side of the structure S.

As noted, the sidewalls of the structure S are spaced a distance apart greater than a width of the folding bed system 10. The roller tracks 70 are secured to inside surfaces of each of the sidewalls. Each roller track includes a roller surface 74 that is curved corresponding to a travel path of the rollers 72 when the head section 12A is pivoted between a deployed position and a pre-stowed position. The pre-stowed position is a position in which the head section 12A and the foot section 12C are pivoted fully upward, but the frame is not yet pushed back into the space. FIG. 9 includes a line PS showing an exemplary position of the head section 12A in the pre-stowed position.

Figure 10A:
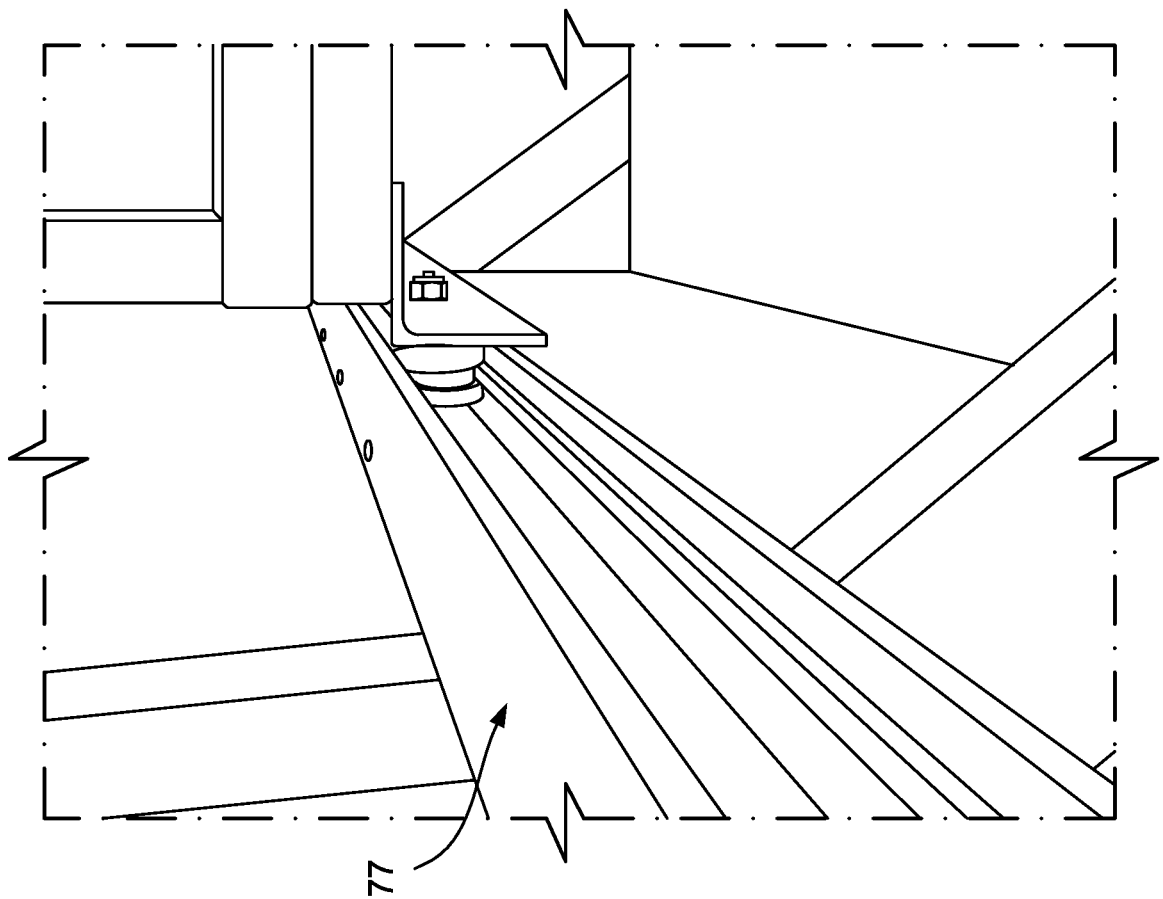
FIG. 10A shows a linear track in which the bed system is displaceable between a pre-stowed position and a stowed position.

The roller tracks 70 also include a supporting surface defining a roller shelf 76 that is positioned to support the rollers 72 when the head section 12A is displaced from the pre-stowed position (shown via the line PS) to a stowed position. With reference to FIGS. 10 and 10A, in the stowed position, the bed system 10 is displaceable relative to the sidewalls of the structure S, and the rollers 72 are pushed back on and supported by the roller shelf 76. The bed system 10 is secured in tracks 77 via rollers or the like to facilitate linear displacement from the pre-stowed position to the stowed position.

A transition nose 78 is positioned between the roller surface 74 and the supporting surface 76. As the head section 12A is pivoted to the pre-stowed position, toward the end of the pivot range, the rollers 72 disengage from the roller track 74 and are pivoted to a position above the transition nose 78 into the pre-stowed position.

Figure 11:
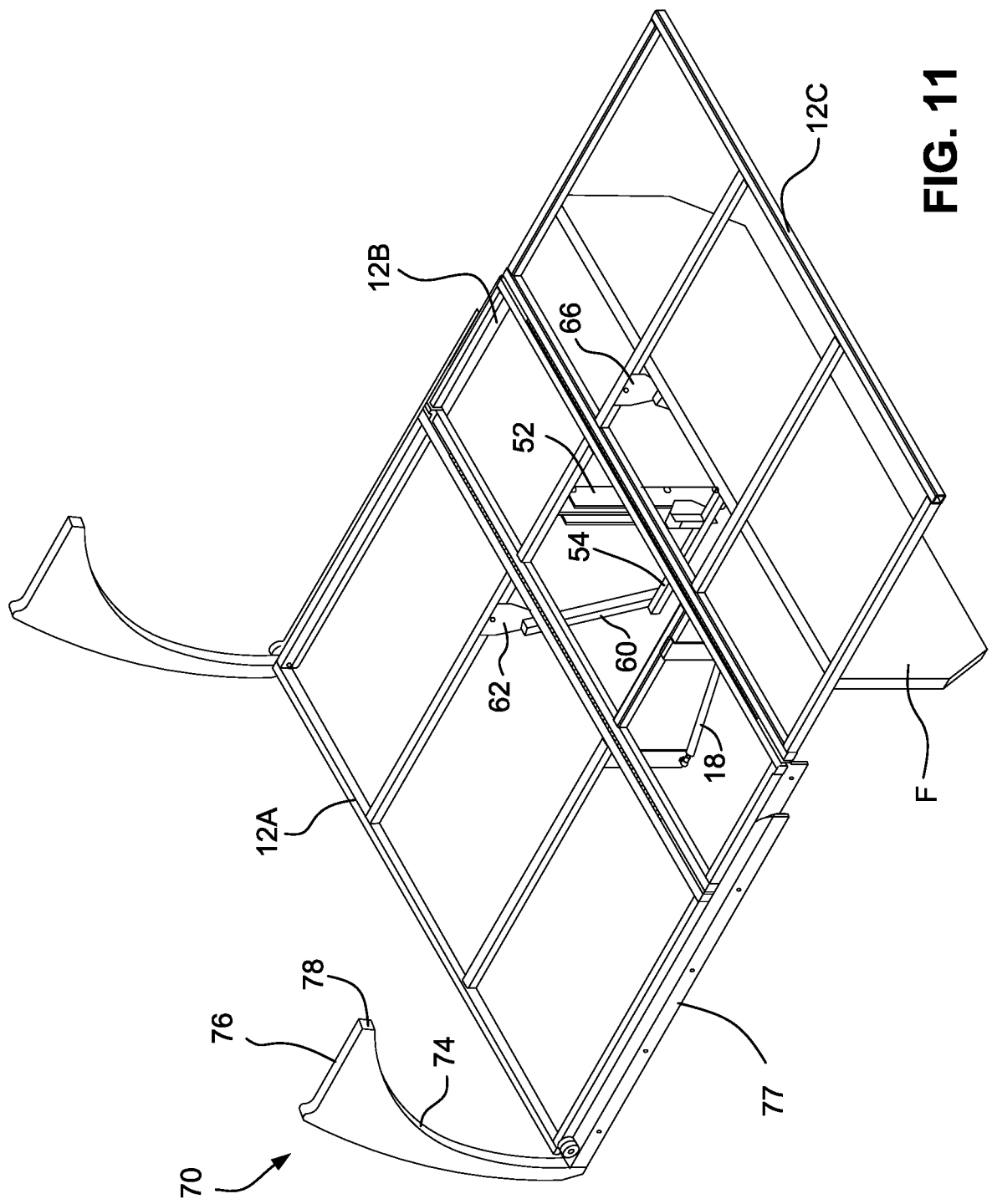
FIGS. 11-13 show the hinge assembly and roller track in the deployed position.
Figure 12:
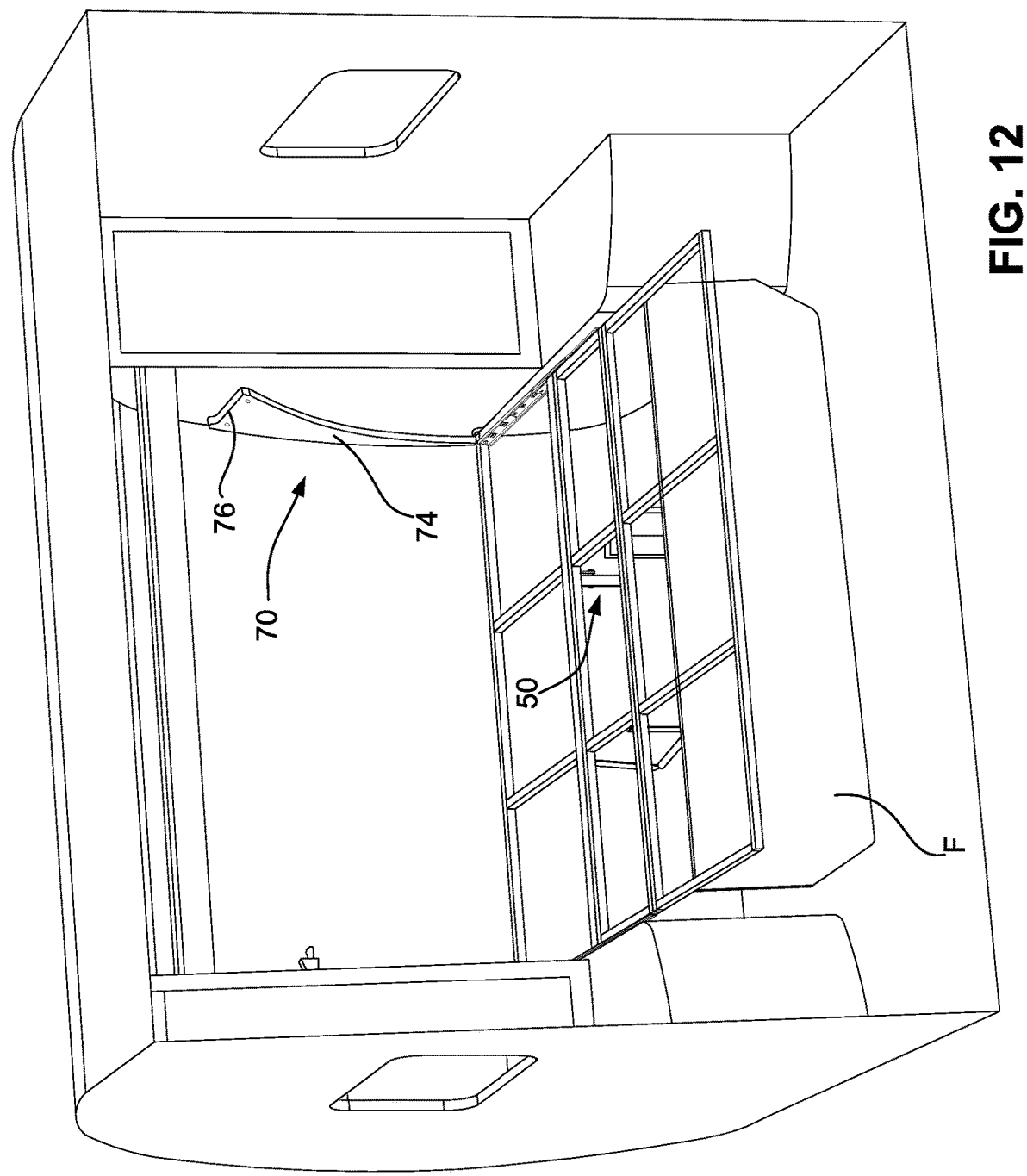
Figure 13:
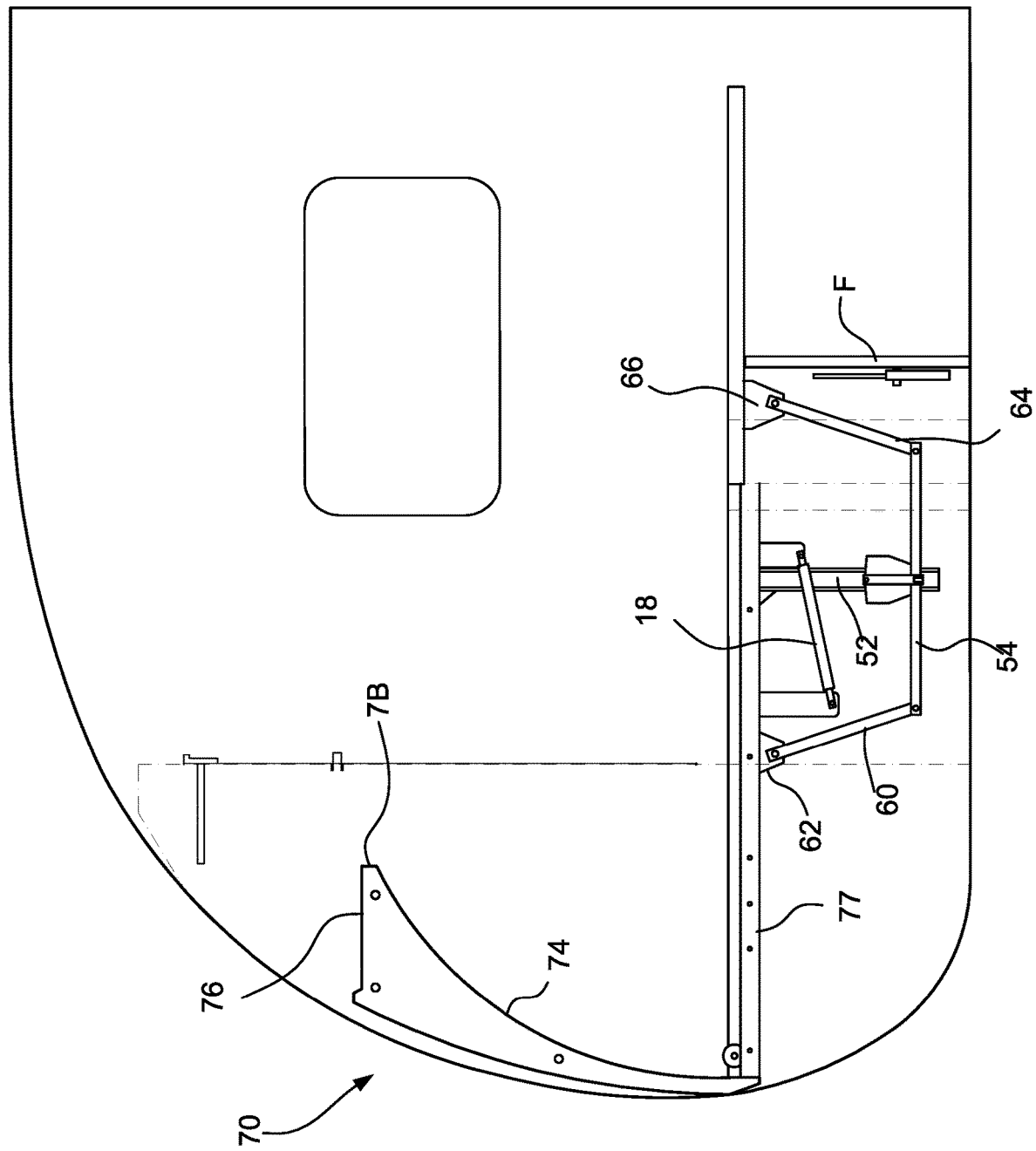
Figure 14:
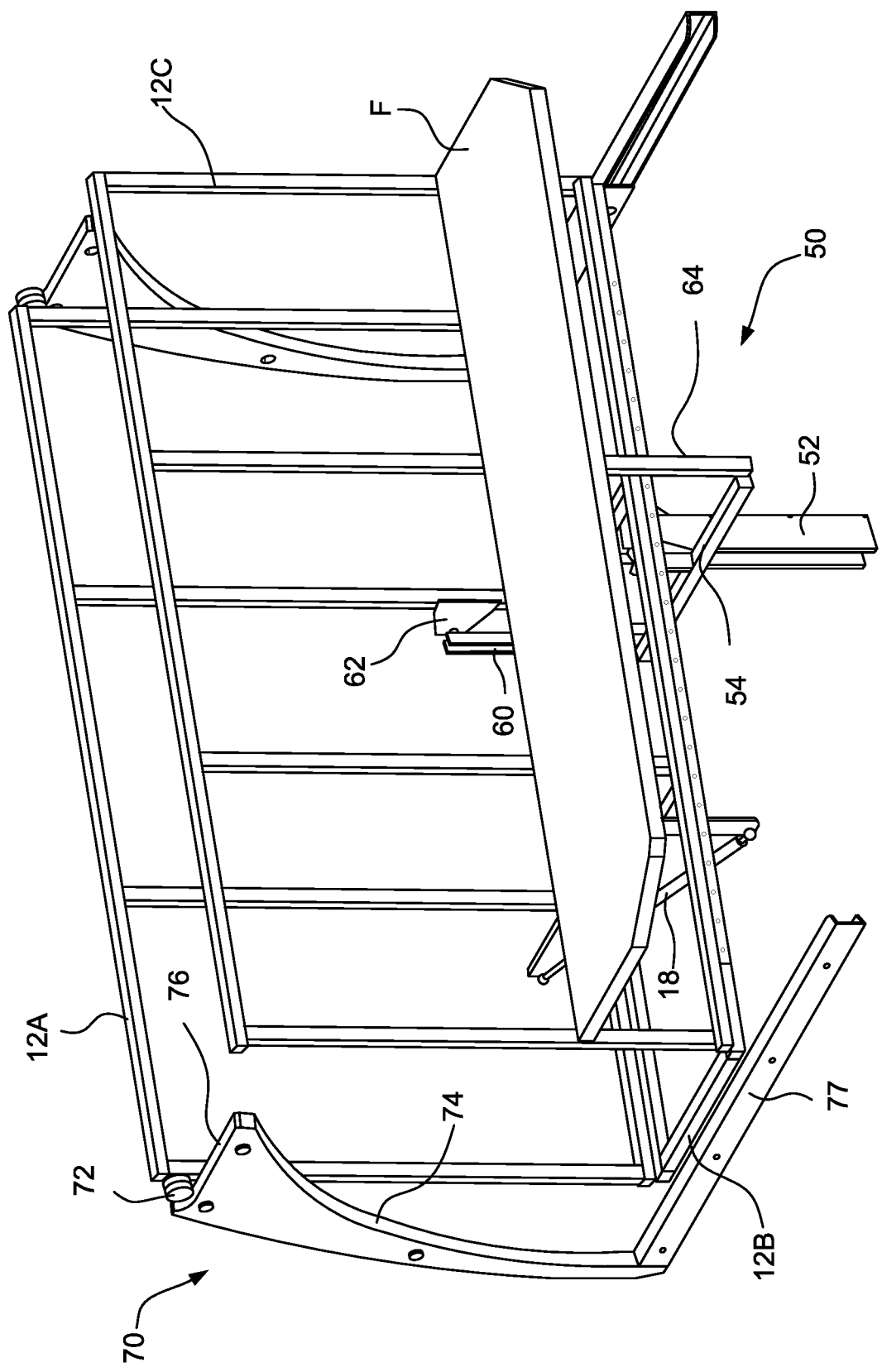
FIGS. 14 and 15 show the hinge assembly and roller track in the stowed position.
Figure 15:
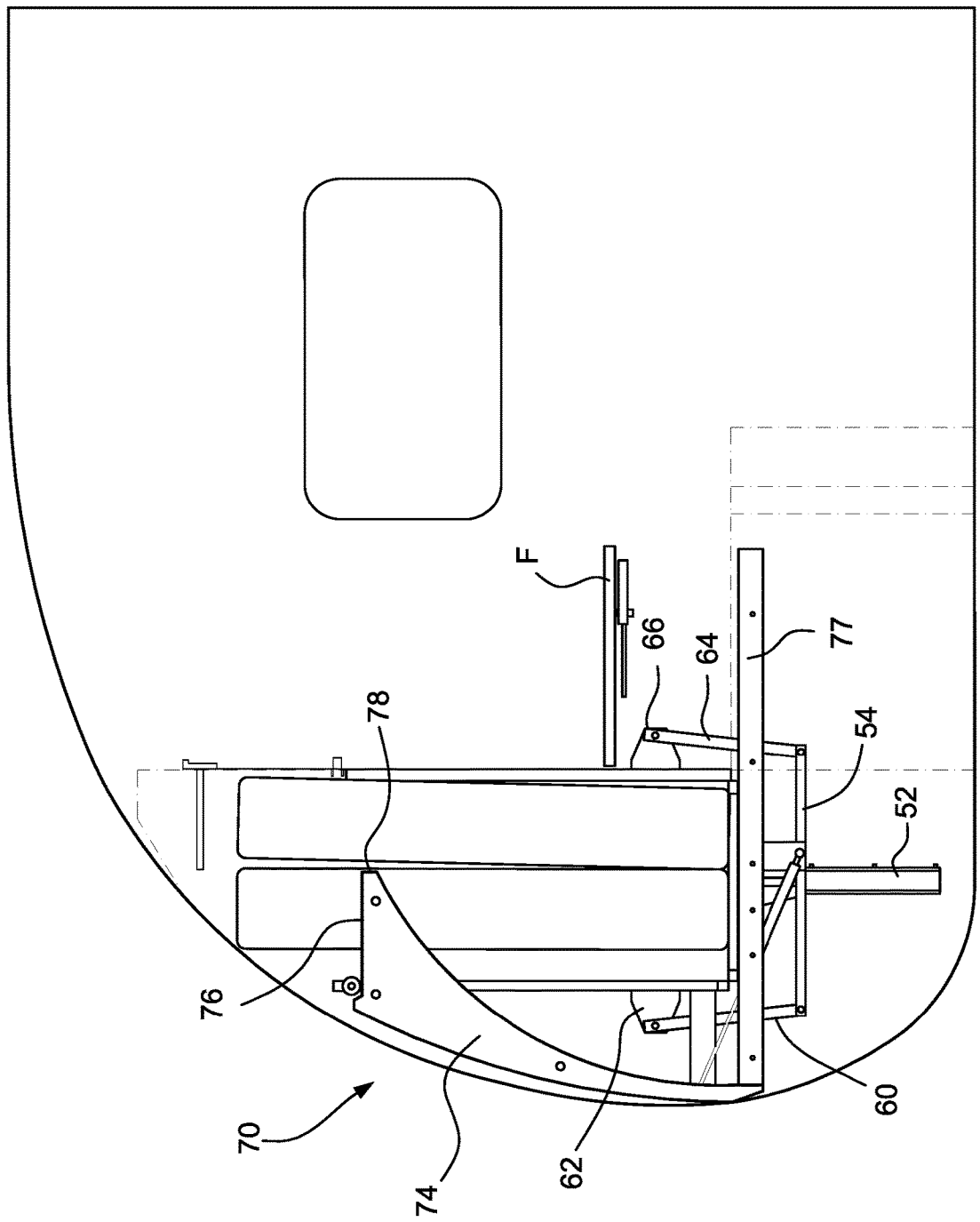

FIGS. 11-13 show the hinge assembly and roller track together in the deployed position, and FIGS. 14 and 15 show the hinge assembly and roller track together in the stowed position.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A folding bed system configured for integration with a structure, the folding bed system comprising:
    a bed frame having a head section, a center section pivotably connected to the head section such that the head section is pivotable relative to the center section, and a foot section connected to and pivotable relative to the center section;
    a slide mechanism including a slide rail fixed to the center section and a guide rail coupled with and linearly displaceable relative to the slide rail, wherein the guide rail is securable to the structure such that the guide rail is stationary and such that a lateral force applied to the bed frame will displace the slide rail relative to the guide rail and thereby pivot the head section relative to the center section; and
    a guide mechanism including a guide track and a slider linearly displaceable relative to the guide track, wherein the slider includes an engagement pin coupled with the head section of the bed frame, and wherein the guide track is securable to the structure.

2. The system of claim 1, further comprising a set strap connected between the guide rail of the slide mechanism and the guide track of the guide mechanism.

3. The system of claim 1, further comprising a gas spring connected between the center section and the head section, the gas spring biasing the head section toward a stowed position.

4. The system of claim 3, further comprising a first lever arm depending from the head section, and a second lever arm depending from the center section, wherein the gas spring is connected between the first and second lever arms.

5. A folding bed system configured for integration with a structure, the folding bed system comprising:
    a bed frame having a head section, a center section pivotably connected to the head section such that the head section is pivotable relative to the center section, and a foot section connected to and pivotable relative to the center section;
    a slide mechanism including a slide rail fixed to the center section and a guide rail coupled with and linearly displaceable relative to the slide rail, wherein the guide rail is securable to the structure such that the guide rail is stationary and such that a lateral force applied to the bed frame will displace the slide rail relative to the guide rail and thereby pivot the head section relative to the center section; and a guide mechanism including a guide track and a slider linearly displaceable relative to the guide track, wherein the slider includes an engagement pin coupled with the head section of the bed frame, and wherein the guide track is securable to the structure, wherein the guide mechanism further comprises at least one latch coupled with the guide track and positioned in a path of the engagement pin, wherein the engagement pin is automatically engaged with the latch when the slider is displaced on the guide track to secure an angular position of the head section relative to the center section.

6. The system of claim 5, wherein the guide mechanism comprises first and second latches coupled with the guide track and spaced apart from each other, wherein the engagement pin is automatically engaged with one of the first and second latches when the slider is displaced on the guide track.

* * * * *